US010091299B2

(12) United States Patent
Mian et al.

(10) Patent No.: US 10,091,299 B2
(45) Date of Patent: Oct. 2, 2018

(54) VEHICLE GROUP MONITORING

(71) Applicant: International Electronic Machines Corporation, Troy, NY (US)

(72) Inventors: Zahid F. Mian, Loudonville, NY (US); Bruce P. McKenney, Selkirk, NY (US); Robert W. Foss, Cohoes, NY (US)

(73) Assignee: International Electronic Machines Corp., Troy, NY (US)

( * ) Notice: Subject to any disclaimer, the term of this patent is extended or adjusted under 35 U.S.C. 154(b) by 66 days.

(21) Appl. No.: 14/306,322

(22) Filed: Jun. 17, 2014

(65) Prior Publication Data

US 2014/0372498 A1    Dec. 18, 2014

Related U.S. Application Data

(60) Provisional application No. 61/956,792, filed on Jun. 17, 2013.

(51) Int. Cl.
*H04L 29/08* (2006.01)
*H04W 4/38* (2018.01)
(Continued)

(52) U.S. Cl.
CPC .......... *H04L 67/12* (2013.01); *B61L 15/0027* (2013.01); *B61L 15/0072* (2013.01);
(Continued)

(58) Field of Classification Search
CPC .............................. H04L 67/12; B61L 15/0027
See application file for complete search history.

(56) References Cited

U.S. PATENT DOCUMENTS 5,293,632 A * 3/1994 Novakovich ........... B60L 15/38
701/19
6,339,397 B1    1/2002 Baker
(Continued)

FOREIGN PATENT DOCUMENTS

| EP | 0748081 A1 | 12/1996 |
| EP | 2000387 A2 | 12/2008 |
| WO | 2014165024 A1 | 10/2014 |

OTHER PUBLICATIONS

Search Report and Written Opinion for PCT Application No. PCT/US2014/042613, Oct. 27, 2014, 12 pages.
(Continued)

*Primary Examiner* — Jess G Whittington
(74) *Attorney, Agent, or Firm* — LaBatt, LLC

(57) ABSTRACT

A solution for managing vehicles both individually and as a group of associated vehicles is provided. A vehicle node can be located on each vehicle in the group and obtain and process data from a plurality of sensors also located on the vehicle. The vehicle node can be configured to communicate, either directly or indirectly, with a group system assigned to the group using a wireless communications solution. The group system can acquire monitoring data for all of the group of associated vehicles, which can be used to manage the group of associated vehicles and/or one or more individual vehicles in the group. The group system can be located on a vehicle traveling as part of the group of associated vehicles or at a fixed location.

23 Claims, 11 Drawing Sheets

(51) Int. Cl.
 *B61L 15/00* (2006.01)
 *B61L 25/02* (2006.01)
 *H04W 4/04* (2009.01)
 *G06Q 10/06* (2012.01)

(52) U.S. Cl.
 CPC ......... *B61L 15/0081* (2013.01); *B61L 25/028* (2013.01); *G06Q 10/063* (2013.01); *H04W 4/046* (2013.01); *H04W 4/38* (2018.02)

(56) References Cited

U.S. PATENT DOCUMENTS

| | | | |
|---|---|---|---|
| 6,885,874 | B2 | 4/2005 | Grube et al. |
| 7,450,083 | B1 | 11/2008 | Baker |
| 7,688,218 | B2 | 3/2010 | LeFebvre et al. |
| 7,705,743 | B2 | 4/2010 | Barone et al. |
| 8,244,411 | B2 | 8/2012 | Baker |
| 8,258,414 | B2 | 9/2012 | Toms |
| 8,514,825 | B1 * | 8/2013 | Addepalli ............. H04W 4/046 370/338 |
| 2006/0290478 | A1 | 12/2006 | Stull et al. |
| 2007/0208841 | A1 * | 9/2007 | Barone ............... B61L 15/0027 709/223 |
| 2007/0233335 | A1 | 10/2007 | Kumar et al. |
| 2009/0003232 | A1 * | 1/2009 | Vaswani ................. H04L 45/00 370/252 |
| 2009/0119001 | A1 | 5/2009 | Moussaeiff et al. |
| 2009/0173840 | A1 * | 7/2009 | Brown ............... B61L 15/0027 246/1 R |
| 2009/0300379 | A1 * | 12/2009 | Mian ..................... G01D 9/005 713/300 |
| 2010/0174428 | A1 * | 7/2010 | LeFebvre ................. B61K 9/00 701/19 |
| 2011/0026451 | A1 * | 2/2011 | Cui ........................ H04B 7/155 370/315 |
| 2011/0282540 | A1 * | 11/2011 | Armitage ................. H04Q 9/00 701/31.4 |
| 2013/0054158 | A1 | 2/2013 | Toms |
| 2014/0025803 | A1 * | 1/2014 | MacKenzie ............ H04L 41/12 709/223 |

OTHER PUBLICATIONS

Australian Application No. 2014281706, Examination Report No. 1, Nov. 17, 2016, 3 pages.
Chinese Application No. 201480042475.5, Office Action1 (with English translation), 22 pages.
Australian Application No. 2014281706, Notice of Acceptance, dated Sep. 11, 2017, 3 pages.
Application No. EP 14 81 3948, Supplementary European Search Report, dated Feb. 16, 2017, 8 pages.
Australian Application No. 2014281706, Examination Report No. 2, dated Mar. 10, 2017, 6 pages.
Baranek, M. et al., "Konzept zur Realisierun eines virtuellen Zugbus-Systems," vol. 102, No. 1-2, Jan. 1, 2010, pp. 20-24.
Chinese Application No. 201480042475.5, Office Action2 (with English translation), dated Jul. 5, 2017, 21 pages.
Chinese Application No. 201480042475.5, Office Action3 (with English translation), dated Jan. 31, 2018, 10 pages.
"ZigBee Specification," Sep. 19, 2012, 622 pages.

* cited by examiner

VEHICLE GROUP MONITORING

REFERENCE TO RELATED APPLICATIONS

The current application claims the benefit of co-pending U.S. Provisional Application No. 61/956,792, titled "Vehicle group monitoring system," which was filed on 17 Jun. 2013, and which is hereby incorporated by reference.

TECHNICAL FIELD

The disclosure relates generally to vehicle monitoring, and more particularly, to monitoring operating conditions of a plurality of related vehicles while the vehicles are traveling, e.g., as part of an associated group.

BACKGROUND ART

A modern vehicle, including an automobile, an aircraft, and/or the like, includes a sensor system capable of monitoring and tracking the operating condition of various components of the vehicle. Problems identified in the operation of a component are reported to the vehicle's control and monitoring system. Furthermore, data regarding the operation of components of the vehicle can be downloaded to a maintenance system, or the like, e.g., when the vehicle is undergoing maintenance.

Wireless sensor nodes have been implemented in some vehicle applications. For many vehicle applications, power harvesting is limited to a small amount of power. As a result, typical wireless sensor nodes used in vehicle applications are severely power limited and have a very short (e.g., a few tens of feet) transmission range for any significant amount of data.

Mesh networking permits nodes in a network to relay data from other nodes which cannot communicate directly with a given node. However, these networks very quickly reach a saturation point in which data throughput becomes far lower than bandwidth would indicate, because most of the network's capacity is, in effect, taken up by the nodes determining which nodes can pass data onward, and via which other nodes. For example, the well-known "Zigbee" 802.15.4 protocol as usually implemented has a theoretical bandwidth of approximately 256 kbps, but in practice with a good-sized array will tend to reach only approximately 36 kpbs—or about 14% of the theoretical capacity. In one approach, a linear relay is implemented to partially alleviate the bandwidth problem, as there is no longer a need to negotiate which nodes can pass information and to where.

SUMMARY OF THE INVENTION

Aspects of the invention provide a solution for managing vehicles both individually and as a group of associated vehicles. A vehicle node can be located on each vehicle in the group and obtain and process data from a plurality of sensors also located on the vehicle. The vehicle node can be configured to communicate, either directly or indirectly, with a group system assigned to the group using a wireless communications solution. The group system can acquire monitoring data for all of the group of associated vehicles, which can be used to manage the group of associated vehicles and/or one or more individual vehicles in the group. The group system can be located on a vehicle traveling as part of the group of associated vehicles or at a fixed location.

A first aspect of the invention provides a method comprising: determining, on a vehicle node located on a first vehicle, a group system assigned to manage data corresponding to a group of associated vehicles including a plurality of vehicles, wherein the group system is located apart from the first vehicle; receiving, at the vehicle node, first vehicle operating data from a plurality of sensors located on the first vehicle while the first vehicle is in the group of associated vehicles; processing, on the vehicle node, the operating data to generate monitoring data corresponding to the first vehicle; and transmitting, from the vehicle node, the monitoring data for processing on the group system.

A second aspect of the invention provides a system comprising: a first vehicle including: a first vehicle node; and a plurality of sensors, wherein the first vehicle node is configured to perform a method including: determining a group system corresponding to the first vehicle, wherein the group system is located apart from the first vehicle; receiving operating data from the plurality of sensors; processing the operating data to generate monitoring data corresponding to the first vehicle; and transmitting the monitoring data for processing on the group system, wherein the first vehicle node has a communications range of less than one kilometer.

A third aspect of the invention provides a system comprising: a group system including at least one computing device; and a consist including a plurality of managed rail vehicles, wherein each of the plurality of managed rail vehicles includes: a vehicle node; and a plurality of sensors, wherein the vehicle node is configured to perform a method including: receiving operating data from the plurality of sensors; processing the operating data to generate monitoring data for the corresponding rail vehicle; and transmitting the monitoring data for processing on the group system, wherein the group system is assigned to manage data corresponding to the plurality of managed rail vehicles and communications between the plurality of vehicle nodes in the consist and a set of monitoring systems.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
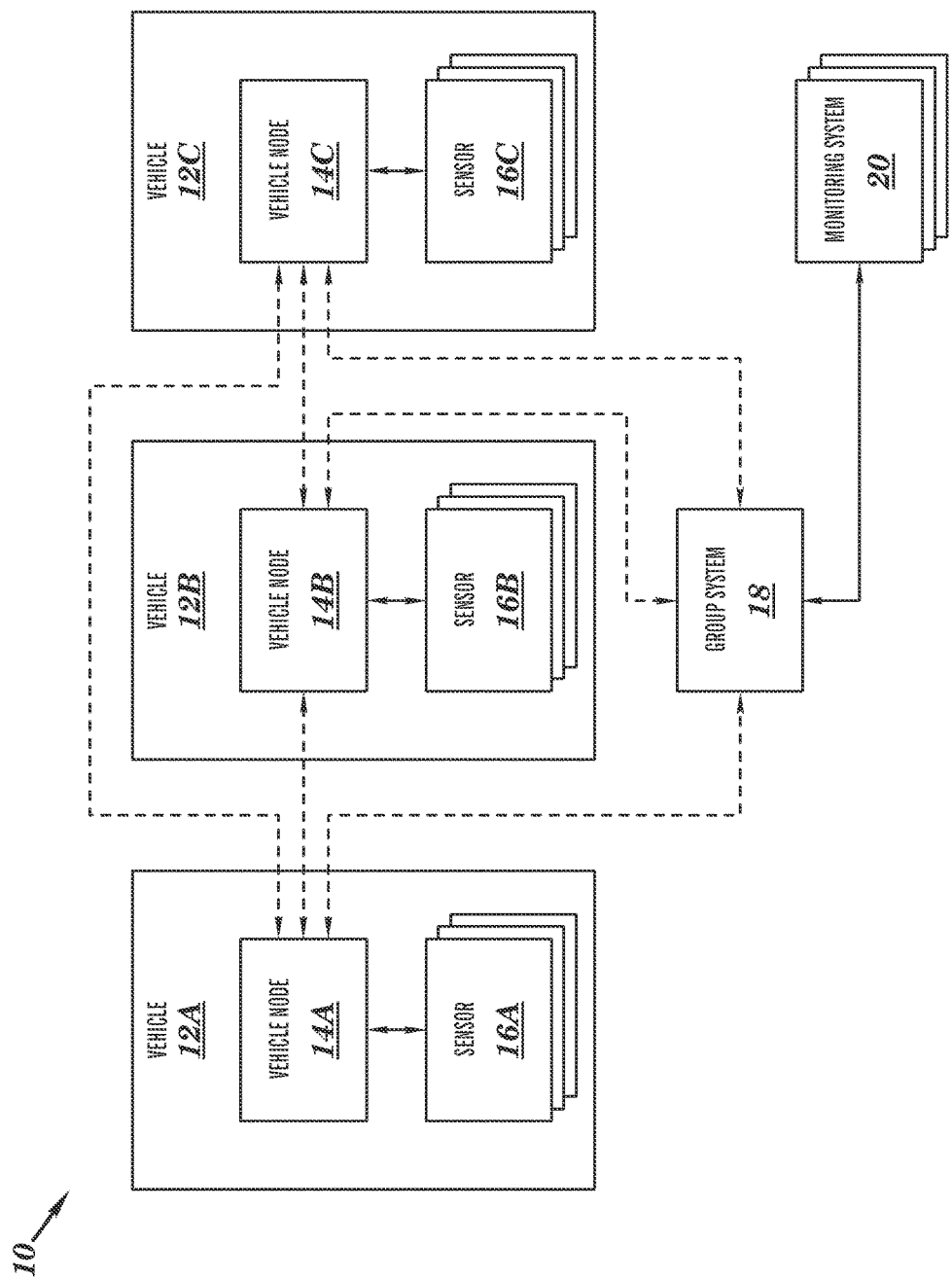
FIG. 1 shows an environment including an illustrative group of associated vehicles according to an embodiment.

The inventors recognize several limitations in prior art vehicle monitoring approaches. For example, to date, no vehicle monitoring approaches seek to monitor and track the operating condition of multiple vehicles traveling in an associated group using a single computer system assigned to manage the acquisition and forwarding of monitoring data for each vehicle in the group. Illustrative aspects of the invention are shown and described in conjunction with rail vehicles included on a train or consist. However, it is understood that embodiments of the invention are equally applicable to other groups of related vehicles. These groups include, for example, a military or commercial convoy, groupings of multiple vehicles, e.g., in platoons, flights, fleets, and/or the like, etc. The inventors recognize that current vehicle monitoring approaches are limited to a particular vehicle and/or acquiring data while the vehicle is being serviced. Any type of monitoring of a fleet of vehicles is performed by analyzing the data acquired off line and is limited to long term fleet management planning. To this extent, neither of these approaches is capable of considering the movement and functionality of a group of related vehicles, as a whole as well as separately, while the vehicles are traveling.

Additionally, current vehicle monitoring approaches are not well suited for implementation on vehicles, such as rail vehicles, which lack an onboard control or navigation system, often lack an onboard power generating source (e.g., a combustion engine) capable of generating and/or distributing a significant amount of power, and/or the like. As a result, data gathered on such a vehicle cannot be utilized without assuring that the data can be communicated to a control location, such as an operating locomotive, at which action(s) can be taken. A distance between the rail vehicle and the locomotive can provide a barrier to any such communication. In particular, limitations in transmission range (e.g., tens of feet) of nodes implemented using a power-conservation design (often necessary for truly independent, low to zero maintenance nodes) make bridging multiple cars in a single network "hop" unfeasible. Use of a linear relay is impractical due to potential changes to the order in which the vehicles are located in the group of related vehicles. Moreover, the bandwidth demands on nodes closer to the control location (e.g., on rail cars closer to the locomotive in a train with a large (e.g., fifty or more) number of cars), rises drastically, with the last node in the line transmitting not only its own data but the data of all of the prior vehicles. Furthermore, the appropriate control location to transmit the data to can change over time (e.g., the rail car is transferred to another train with a different locomotive), making determining the appropriate location (e.g., locomotive or rail yard) with which to communicate an additional barrier to sharing such data.

Embodiments of the invention described herein can address one or more of the limitations of previous approaches. For example, an embodiment provides an overarching network architecture having vehicles as the central elements of the network. Network operations can include dynamically identifying associated groups of vehicles including vehicle nodes, which can communicate with an associated group system while ignoring other local group systems. Each vehicle node can communicate with an assigned group system, automatically determine the group system, and/or dynamically change the group system in response to operating conditions. Vehicle nodes for a group of related vehicles can use efficient data relaying designs to assure data throughput without overloading individual vehicle nodes. An embodiment also provides a smart vehicle node which can aggregate and manage the data for the corresponding vehicle and/or have a higher power and/or computational ability than the individual sensor nodes included on the vehicle. Utilization of a smart vehicle node can reduce power and/or computational requirements of the sensors, while the collection of a vehicle node and sensors can provide advanced vehicle identification and condition tracking/monitoring. It is understood that these innovations are only illustrative of the innovations described herein.

As indicated above, aspects of the invention provide a solution for managing vehicles both individually and as a group of associated vehicles. A vehicle node can be located on each vehicle in the group and obtain and process data from a plurality of sensors also located on the vehicle. The vehicle node can be configured to communicate, either directly or indirectly, with a group system assigned to the group using a wireless communications solution. The group system can acquire monitoring data for all of the group of associated vehicles, which can be used to manage the group of associated vehicles and/or one or more individual vehicles in the group. The group system can be located on a vehicle traveling as part of the group of associated vehicles or at a fixed location. As used herein, unless otherwise noted, the term "set" means one or more (i.e., at least one) and the phrase "any solution" means any now known or later developed solution.

Turning to the drawings, FIG. 1 shows an environment including an illustrative group 10 of associated vehicles 12A-12C according to an embodiment. As described herein, the vehicles 12A-12C are being utilized in a manner such that the vehicles 12A-12C are traveling together. Each vehicle 12A-12C is shown including a vehicle node 14A-14C and a plurality of sensors 16A-16C located thereon. During operation of a vehicle 12A-12C, the sensors 16A-16C can acquire operating data and communicate the operating data to the corresponding vehicle node 14A-14C using any solution. Each vehicle node 14A-14C can be configured to process the operating data. Additionally, each vehicle node 14A-14C can communicate monitoring data for the vehicle 12A-12C for processing on a group system 18. The group system 18 can be configured to perform any type of processing on the monitoring data. For example, the group system 18 can be configured to operate as a gateway, in which case the group system 18 can store the monitoring data and forward it to one or more monitoring systems 20. Additionally, the group system 18 can be configured to process the monitoring data in order to affect one or more aspects of a manner in which the group 10 of associated vehicles 12A-12C is traveling. The affecting can include, for example, temporarily stopping the group 10 to address a problem, adjusting a speed at which the group 10 is traveling, altering an original route of the group 10, and/or the like. For example, a group 10 can initially start traveling at a first speed, and slow down in response to a detected problem, speed up in response to confirmation of no detected problems after a period of operation, and/or the like.

The group 10 can be defined using any solution. For example, the vehicles 12A-12C can be physically connected to one another, such as part of a consist, train, semi-trailer truck, and/or the like, and therefore traveling together. As used herein, two vehicles, such as vehicles 12A, 12C are physically connected to one another if they are directly connected (e.g., via coupling mechanisms located on each vehicle) or if they are indirectly connected (e.g., via couplings with one or more intervening vehicles, such as vehicle 12B). Alternatively, the group 10 can be defined by multiple, independently operated vehicles 12A-12C having a same destination, traveling the same route, and/or the like. In this case, illustrative groups 10 include a convoy, a platoon, a fleet, and/or the like. Furthermore, an illustrative group 10 can comprise otherwise unrelated vehicles 12A-12C that are concurrently traveling along the same route, such as a highway. In either case, the group 10 can be predefined, determined in an ad hoc manner, be dynamically changed, and/or the like.

The group system 18 can be in any of various locations. For example, the group system 18 can be located on a vehicle 12A-12C in the group 10 or on another vehicle associated with the group 10. To this extent, when the group 10 is a train, the group system 18 can be located on a railcar (e.g., a locomotive) being utilized to power the train. Similarly, when the group 10 is a semi-trailer truck, the group system 18 can be located on the tractor truck. For other types of groups 10 including multiple independently operated vehicles 12A-12C, a vehicle 12A-12C in the group 10 can be designated as a control vehicle using any solution (e.g., a lead vehicle, a command vehicle, and/or the like). Additionally, the group system 18 can be located apart from any vehicle. For example, the group system 18 can be located in a fixed location, e.g., adjacent to a route being traveled by the vehicles 12A-12C. To this extent, the group system 18 can be located in a rail yard, adjacent to a highway, along a shipping lane, and/or the like. Furthermore, while a single group system 18 is shown, it is understood that multiple distinct group systems 18 may be utilized during a single journey by the group 10. Additionally, multiple possible group systems 18 may be present in a location. In this case, the vehicle nodes 14A-14C in the group 10 can be configured to communicate with the appropriate group system 18 as described herein. In either case, each vehicle node 14A-14C can communicate with only a single group system 18 at any given time.

Figure 2:
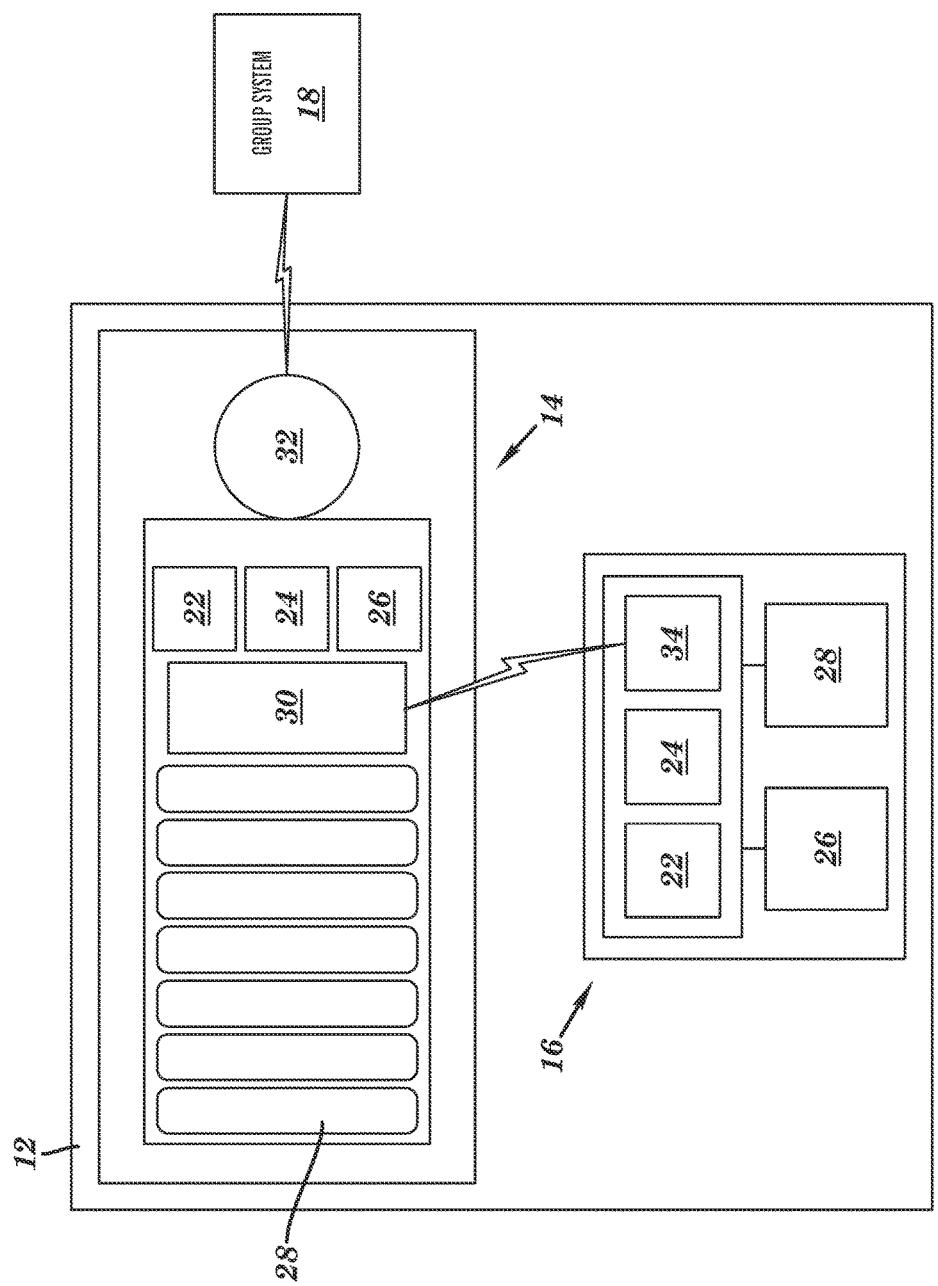
FIG. 2 shows a more detailed view of an illustrative vehicle node and an illustrative sensor node located on a vehicle according to an embodiment

Each vehicle node 14A-14C and sensor 16A-16C can be implemented using any solution. In an embodiment, a sensor 16A-16C is implemented as a node capable of communicating with a corresponding vehicle node 14A-14C using a wireless communications solution. To this extent, FIG. 2 shows a more detailed view of an illustrative vehicle node 14 and an illustrative sensor node 16 located on a vehicle 12 according to an embodiment. In an embodiment, each node 14, 16 is permanently or temporarily affixed to a location of the vehicle using any solution, which ensures that the node 14, 16 will not fall off the vehicle 12 during use and that the node 14, 16 can function in the desired manner. Each node 14, 16 is shown including a processing component 22, a storage component 24, a sensor component 26, and a power component 28. Each component 22, 24, 26, 28 can be selected based on any of various types of operating characteristics. In an embodiment, the vehicle node 14, and the corresponding components thereof, provides a higher computing capability than the sensor node 16.

The processing component 22 can comprise any type of component capable of controlling the operation the corresponding node 14, 16. An appropriate processing component 22 for the corresponding node 14, 16 can be selected using any solution, e.g., based on one or more operating characteristics including, but not limited to, processing speed, power demand, size, memory, device control capability, and/or the like. Similarly, the storage component 24 for the corresponding node 14, 16 can be selected using any solution, e.g., based on one or more characteristics including, but not limited to, storage size, power demand, storage type, storage performance, and/or the like. In an embodiment, the storage component 24 for each node 14, 16 is selected to have a sufficient size to provide a buffer for the corresponding data (e.g., sensor data) for a target period of time. In this case, the storage component 24 can preserve and recover data that may have been lost during a transmission, unable to be transmitted for the target period of time, and/or the like.

In an embodiment, the vehicle node 14 includes one or more specialized features, which can enable the sensor nodes 16 to be less complex. The less complex sensor nodes 16 can therefore require less power (e.g., be ultra low power devices), be constructed smaller so that they can fit in additional locations, and/or the like. However, it is understood that a sensor node 16 can be of any size, have any desired amount of computing capability (e.g., to process data prior to transmitting data to the vehicle node), and/or the like. Illustrative features that can be implemented by the vehicle node 14 include, but are not limited to, an ability to aggregate operating data received from all sensor nodes 16 located on a vehicle 12; process the operating data to generate monitoring data for the vehicle 12; and/or the like. The processing can include, for example, noise filtering, direct data analysis, trending, pattern recognition, and/or the like. In an illustrative embodiment, the vehicle node 14 can perform fast Fourier transforms (FFTs) on operational data, such as vibration data, to detect particular patterns that may indicate a flaw of various sorts. Furthermore, the vehicle node 14 can fuse the operational data received from multiple sensor nodes 16 to analyze one or more aspects of the vehicle operation, filter out bad data (e.g., from a malfunctioning sensor), and/or the like.

The sensor component 26 and/or power component 28 can be selected based on a particular application for the corresponding node 14, 16. In particular, the sensor component 26 for a node 14, 16 can be configured to acquire any of various types of data while the corresponding vehicle 12 is in motion. Illustrative sensors include, but are not limited to a strain gauge, accelerometer, vibration, temperature, acoustic, and/or the like, one or more of which can be included in the sensor component 26. In an embodiment, the sensor component 26 for the vehicle node 14 and/or the sensor node 16 includes a GPS system.

Similarly, the power component 28 can include an interface for connecting to an external power source (when available), a battery, one or more power generating devices, and/or the like. In an embodiment, the power component 28 for the sensor node 16 includes a power generating device capable of generating sufficient power to operate the sensor node 16 while the vehicle 12 is in motion. To this extent, the power component 28 can include a power harvesting device configured to generate power from the motion of the vehicle 12 using any solution (e.g., piezoelectric, electromagnetic, and/or the like). In another embodiment, the power component 28 for the vehicle node 14 can include a renewable power source, such as a solar panel of a sufficient size, to generate significant power for operating the vehicle node 14 with a reasonable amount of sunlight. In this case, the power component 28 and/or the entire vehicle node 14 can be placed in a location conducive to receiving a significant amount of sunlight during operation of the vehicle 12, such as on a roof of the vehicle 12. However, it is understood that a solar panel is only illustrative of various types of power generating devices. For example, an embodiment can include an electromagnetic generator, a wind turbine, and/or other type of power generating device.

The vehicle node 14 is shown including a communications component 30, which can be operatively connected to an antenna component 32, while the sensor node 16 includes a communications component 34. The communications component 34 can be configured to communicate with the communications component 30 of the vehicle node 14 using any solution. For example, each communications component 30, 34 can include a transceiver, such as a radio frequency transceiver, for wireless communications between the vehicle node 14 and the sensor node 16. An appropriate transceiver can be selected using any solution, e.g., based on one or more operating characteristics including, but not limited to, an operating range, bandwidth, programmability, security, size, power requirements, and/or the like.

The vehicle node 14 also can be configured to communicate with another vehicle node 14 located on another vehicle 12 in a group of associated vehicles and/or with a group system 18. In either case, the communications component 30 can include one or more additional transmitters/receivers, which enable the vehicle node 14 to communicate over longer distances, e.g., to a vehicle node located on another vehicle, a group system 18, and/or the like, as described herein. For example, the vehicle node 14 can use a longer range wireless communications transceiver implemented as part of the communications component 30 to implement the communications functionality. In an embodiment, the communications component 30 includes multiple transceivers, each with a different power level, channel, and/or the like, to implement the different types of communication. In a more particular embodiment, the communications component 30 includes a short-range communications system (e.g., based on the Nordic line of transceiver chips) for use in communicating with nearby sensor nodes 16, and a higher-power, longer range transceiver (e.g., such as one from Nanotron) for use in communicating with other vehicle nodes and/or the group system 18.

In an embodiment, communications between a vehicle node 14 and a sensor node 16 can be direct or indirect. For example, depending on a design of the vehicle 12, a location of the sensor node 16, cargo present in the vehicle 12, and/or the like, the sensor node 16 may not be able to directly communicate with the vehicle node 14. To this extent, the vehicle node 14 and sensor nodes 16 can implement a network design, such as a mesh communications network, in which all nodes 14, 16 in the communications network can communicate with each other as needed. In this case, each sensor node 16 can maintain data regarding other sensor nodes present within a communications range. When required to communicate with the vehicle node 14, the sensor node 16 can relay its data through one or more other sensor nodes 16 to the vehicle node 14 using the data. Similarly, the vehicle node 14 transmit directives to a sensor node 16 through one or more other sensor nodes. Regardless, it is understood that each sensor node 16 primarily communicates with the vehicle node 14, and not other sensor nodes, which may be present within a communications range.

Additionally, the vehicle nodes 14 can be configured to enable indirect communications with a group system 18. For example, each vehicle node 14 can maintain a routing table of all other vehicle nodes 14 with which it can communicate (e.g., based on previous communications, receipt of messages transmitted by the other vehicle node(s), and/or the like). The routing table can include an indication of the dynamic nature of the connection, and can enable any other vehicle node 14 to determine which vehicle node 14 will provide it with the most efficient route to communicate with the group system 18 and/or any other vehicle node 14. In an embodiment, each vehicle node 14 periodically advertises/broadcasts its current routing table to all other vehicle nodes 14, and each vehicle node 14 can process the routing table(s) to determine a most effective communications route for communicating with the group system 18 and/or another vehicle node 14.

In an illustrative embodiment, the vehicle node 14 and/or the sensor node 16 are implemented as a processing node and/or a sensor node, respectively, as shown and described in U.S. patent application Ser. No. 12/469,167, filed on 20 May 2009, which is hereby incorporated by reference.

Figure 3:
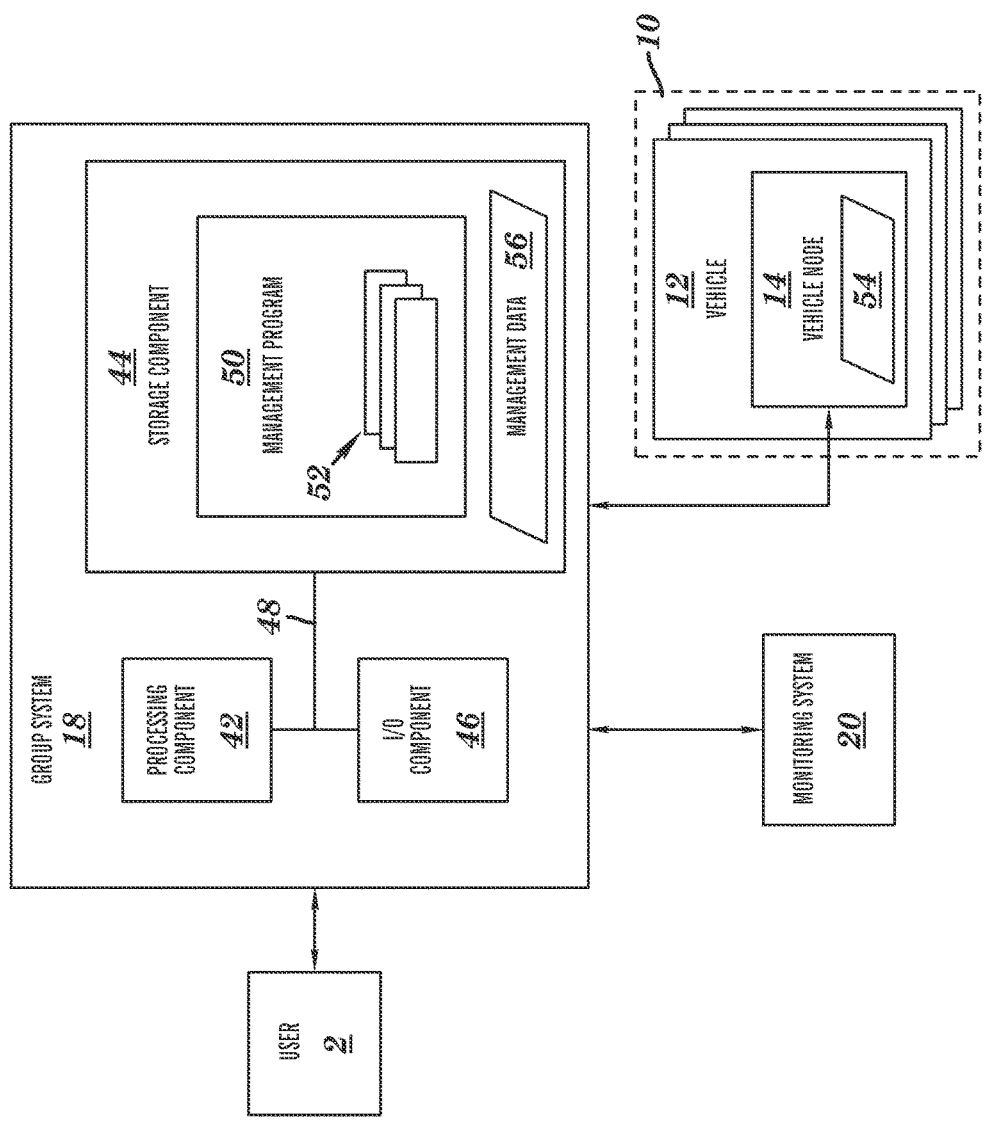
FIG. 3 shows a more detailed view of an illustrative group system according to an embodiment.

FIG. 3 shows a more detailed view of an illustrative group system 18 according to an embodiment. In this case, the group system 18 is implemented as a computer system including a management program 50, which makes the group system 18 operable to manage communications with and data corresponding to a group 10 of associated vehicles 12 while the group 10 is traveling by performing a process described herein.

The group system 18 is shown including a processing component 42 (e.g., one or more processors), a storage component 44 (e.g., a storage hierarchy), an input/output (I/O) component 46 (e.g., one or more I/O interfaces and/or devices), and a communications pathway 48. In general, the processing component 42 executes program code, such as the management program 50, which is at least partially fixed in the storage component 44. While executing program code, the processing component 42 can process data, which can result in reading and/or writing transformed data from/to the storage component 44 and/or the I/O component 46 for further processing. The pathway 48 provides a communications link between each of the components in the group system 18. The I/O component 46 can comprise one or more human I/O devices, which enable a human user 2 to interact with the group system 18 and/or one or more communications devices to enable a system user 2 and/or a monitoring system 20 to communicate with the group system 18 using any type of communications link. To this extent, the management program 50 can manage a set of interfaces (e.g., graphical user interface(s), application program interface, and/or the like) that enable human and/or system users 2, 20 to interact with the management program 50. Furthermore, the management program 50 can manage (e.g., store, retrieve, create, manipulate, organize, present, etc.) the data, such as management data 56, using any solution.

In any event, the group system 18 can comprise one or more general purpose computing articles of manufacture (e.g., computing devices) capable of executing program code, such as the management program 50, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the management program 50 can be embodied as any combination of system software and/or application software.

Furthermore, the management program 50 can be implemented using a set of modules 52. In this case, a module 52 can enable the group system 18 to perform a set of tasks used by the management program 50, and can be separately developed and/or implemented apart from other portions of the management program 50. As used herein, the term "component" means any configuration of hardware, with or without software, which implements the functionality described in conjunction therewith using any solution, while the term "module" means program code that enables a group system 18 to implement the actions described in conjunction therewith using any solution. When fixed in a storage component 44 of a computer system (e.g., group system 18) that includes a processing component 42, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the group system 18.

When the group system 18 comprises multiple computing devices, each computing device can have only a portion of the management program 50 fixed thereon (e.g., one or more modules 52). However, it is understood that the group system 18 and the management program 50 are only representative of various possible equivalent computer systems that may perform a process described herein. To this extent, in other embodiments, the functionality provided by the group system 18 and the management program 50 can be at least partially implemented by one or more computing devices that include any combination of general and/or specific purpose hardware with or without program code. In each embodiment, the hardware and program code, if included, can be created using standard engineering and programming techniques, respectively.

Regardless, when the group system 18 includes multiple computing devices, the computing devices can communicate over any type of communications link. Furthermore, while performing a process described herein, the group system 18 can communicate with one or more other computer systems, such as the vehicle node 14 of a vehicle 12, the monitoring system 20, and/or the like, using any type of communications link. In either case, the communications link can comprise any combination of various types of optical fiber, wired, and/or wireless links; comprise any combination of one or more types of networks; and/or utilize any combination of various types of transmission techniques and protocols.

As described herein, the group system 18 can manage communications with and data corresponding to the group 10 of associated vehicles 12, e.g., as they are traveling as a group 10, which can be stored as management data 56. While the group system 18 is shown managing communications and data for a single group 10, it is understood that a group system 18 can concurrently manage communications and data for multiple distinct groups 10. Additionally, the group system 18 can provide information corresponding to the group 10 and/or one or more vehicles 12 for processing by one or more monitoring systems 20 and/or users 2. For example, an illustrative user 2 comprises an onboard control or navigation system of a vehicle on which the group system 18 is located. A monitoring system 20 can be implemented using any solution, e.g., as a computer system configured in a similar manner as shown for the group system 18. A monitoring system 20 can provide long term management of the various vehicles 12, high level monitoring of the movement of the group 10, and/or the like. For example, a monitoring system 20 can comprise a fleet management system of an entity which owns or is otherwise assigned the vehicles 12 and is responsible for maintaining the vehicles 12, operating the vehicles 12, scheduling vehicle 12 travel, and/or the like.

Furthermore, a monitoring system 20 can provide temporary management of one or more aspects of the vehicle 12 by an entity temporarily concerned with the vehicle 12. To this extent, the group system 18 and vehicle nodes 14 can provide a mechanism through which various entities can manage one or more aspects of one or more vehicles 12 in the group 10. For example, when the vehicle 12 comprises a rail vehicle being used to transport cargo, the vehicle node 14 can acquire operating data from one or more sensors corresponding to the cargo located on the vehicle 12 as well as one or more sensors corresponding to a physical condition of a component of the vehicle 12. In this case, an entity that owns the cargo can access real time data corresponding to a location and/or condition of the cargo, an entity that owns the vehicle 12 can access real time data corresponding to a location and/or condition of the vehicle 12, and an entity that is managing the transport of the vehicle as part of a train can access real time data corresponding to a location of the train, a condition of each vehicle 12 on the train, and/or the like.

In an illustrative embodiment, the group 10 of associated vehicles 12 are rail vehicles. For example, the group 10 can be defined as those rail vehicles 12 included as part of a train or other type of consist. In this case, aspects of the invention can provide a communications infrastructure enabling management of one or more aspects of the consist using operating data received from the vehicles 12 while the consist is moving. Such management can be performed, for example, by a group system 18 located on a rail vehicle controlling movement of the consist, such as a locomotive, by a group system 18 present in a rail yard, by a monitoring system 20, and/or the like.

Figure 4:
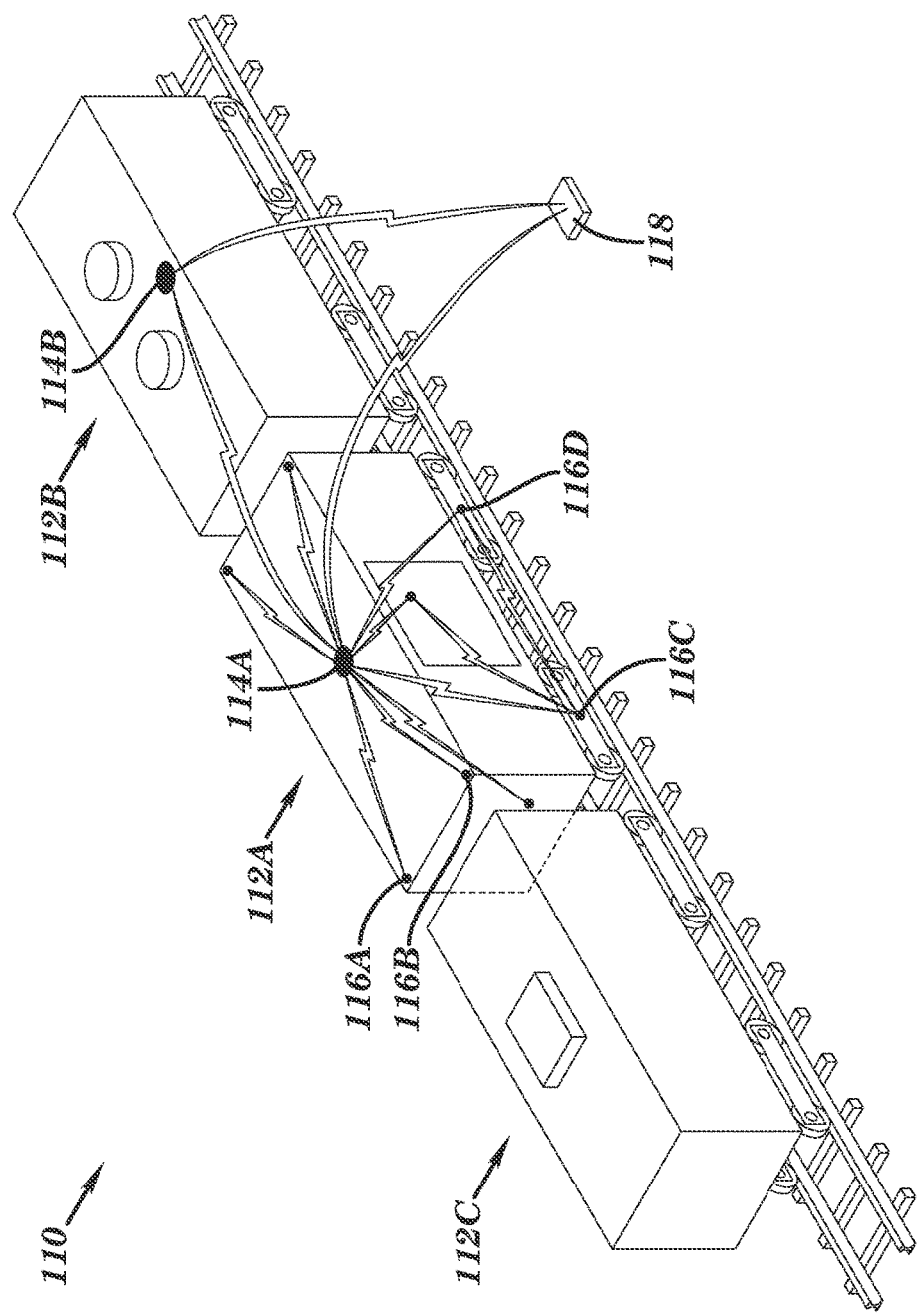
FIG. 4 shows an illustrative rail vehicle according to an embodiment.

To this extent, FIG. 4 shows an illustrative rail vehicle 112A according to an embodiment. The rail vehicle 112A can be coupled to rail vehicles 112B, 112C and be traveling along a set of rails as part of a consist 110. The rail vehicle 112A is shown including a vehicle node 114A, which can be configured to communicate with various sensors 116A-116D located on the rail vehicle 112A and receive operating data therefrom. Each sensor 116A-116D can be configured to acquire any type of operating data. For example, illustrative types of operating data include measurement data corresponding to: vibration, strain, temperature, and/or the like. It is understood that a particular configuration of sensors 116A-116D (e.g., number, locations, etc.) and the corresponding operating data acquired by the sensors 116A-116D can vary depending on the information desired by an operator of the rail vehicle 112A, the cargo of the rail vehicle 112A, and/or the like. For example, when the rail vehicle 112A is carrying chemical(s), one or more chemical sensors can be included on the rail vehicle 112A. Similarly, while the sensors 116A-116D are shown as being associated with the rail vehicle 112A, it is understood that one or more sensors 116A-116D can be included in the cargo being carried by the rail vehicle 112A. For example, pressurized cargo, temperature-controlled cargo, and/or the like, can include one or more sensors 116A-116D (e.g., pressure sensor, temperature sensor, and/or the like) present within the pressurized/temperature-controlled area.

Regardless, each sensor 116A-116D can be configured to communicate with the vehicle node 114A using any solution. For example, a sensor 116A-116D can have a physical communications link (e.g., wired, optical fiber, and/or the like) with the vehicle node 114A. Such a configuration can be suitable when a sensor 116A-116D is intended to be affixed to the rail vehicle 112A for an extended period of time, when the sensor 116A-116D and/or a location therefor, is installed during manufacture of the rail vehicle 112A, when the sensor 116A-116D requires power provided by the vehicle node 114A, and/or the like.

In an embodiment, one or more sensors 116A-116D is configured to communicate with the vehicle node 114A using a wireless communications solution. In this case, the sensor 116A-116D can comprise its own node/unit (e.g., a computing device), which is capable of short range (e.g., approximately one hundred feet or less) wireless communications, and includes the required components for such communications. Furthermore, a sensor 116A-116D can have a corresponding unique identifier, which can assure that the vehicle node 114A can identify the source of the operational data. In an embodiment, the sensor 116A-116D includes identification information for the corresponding rail vehicle 112A on which the sensor 116A-116D is located and/or the component of the rail vehicle 112A with which the sensor 116A-116D is associated. Such information can be used to identify the correct vehicle node 114A with which the sensor 116A-116D is to communicate, associate operational data with the correct vehicle and component for long-term condition monitoring, and/or the like. The identification data can be stored on the sensor 116A-116D using any solution (e.g., programmed or otherwise set during installation, dynamically derived from an operating context, and/or the like). While one or more of the sensors 116A-116D can be implemented as a separate unit from the vehicle node 114A, it is understood that the vehicle node 114A can include an ability to acquire data from one or more sensors 116A-116D implemented as part of the vehicle node 114A. To this extent, a rail vehicle 112A can have any number of zero or more sensor nodes in addition to the vehicle node 114A, which itself can be a sensor node.

In any event, each sensor 116A-116D is configured to communicate with a single vehicle node 114A. In an embodiment, each sensor 116A-116D establishes communications with the vehicle node 114A by registering with the corresponding vehicle node 114A. The registration can be such that the sensor 116A-116D recognizes the corresponding vehicle node 114A with which to communicate and the vehicle node 114A is aware of the corresponding sensor 116A-116D. Registration can be implemented using any solution. For example, for a wired connection between the sensor 116A-116D and the vehicle node 114A, registration can be inferred by the physical connection between the nodes.

Alternatively, e.g., for embodiments using wireless communications between the sensor 116A-116D and the vehicle node 114A, the sensor 116A-116D can be programmed with identification information of the vehicle node 114A of the corresponding vehicle 112A during or prior to installation of the sensor 116A-116D. During start up, the sensor 116A-116D can directly contact the vehicle node 114A using the identification information, and the vehicle node 114A can update a list of sensors 116A-116D for the vehicle 112A. Similarly, the vehicle node 114A can be programmed with identification information for one or more of the corresponding sensors 116A-116D, e.g., during installation, as part of an update/maintenance operation, and/or the like. In an embodiment, both the vehicle node 114A and a sensor 116A-116D are programmed with identification. For example, the vehicle node 114A and the sensor 116A-116D can be programmed with identification information for the vehicle 112A. Subsequently, when the sensor 116A-116D commences communication, the vehicle node 114A can determine whether the vehicle 112A identification information of the sensor 116A-116D and the vehicle node 114A match, and if so, the vehicle node 114A can register the sensor 116A-116D on the network managed by the vehicle node 114A.

In an embodiment, the identification information for each sensor 116A-116D enables the sensor 116A-116D to be uniquely identified among all sensors 116A-116D operating in a system (e.g., an entire fleet of vehicles). For example, the identification information can comprise an Internet Protocol Version 4 (IPv4) or Version 6 (IPv6) address. Furthermore, the group system 118 (and/or a monitoring system 20 shown in FIG. 1) can include data identifying the vehicle 112A and/or component of the vehicle 112A with which the sensor 116A-116D is associated. In this case, registration between the vehicle node 114A and a sensor 116A-116D associated with the same vehicle 112A is less important. For example, the sensor node 116D can communicate with the vehicle node 114B located on the vehicle 112B or the vehicle node 114A located on the vehicle 112A. In either case, monitoring data corresponding to the vehicle 112A can be provided for processing on the group system 118, and the group system 118 (and/or the monitoring system 20) can correctly identify the vehicle 112A and/or component of the vehicle 112A corresponding to the monitoring data.

In this embodiment, registration between the vehicle node 114A and each sensor 116A-116D associated with the same vehicle 112A can occur over a period of operation and/or be allowed to dynamically change. For example, the vehicle node 114A can maintain information regarding each of the various sensors 116A-116D with which it communicates over an extended period of operation (e.g., hours, days, weeks, or more). Over time, the vehicle node 114A can observe that a particular set of sensors 116A-116D are nearly always or always present within range of the vehicle node 114A, regardless of its operating condition (e.g., parked on a siding, part of a train, in a railyard awaiting assignment to a consist, and/or the like). Once this association passes a high threshold of probability, the vehicle node 114A can send a registration signal to the sensor 116A-116D informing the sensor 116A-116D that it is associated with the vehicle node 114A. Furthermore, a similar analytical process can be implemented by the group system 118 (and/or the monitoring system 20), which can transmit the associations and registrations to the various vehicle nodes 114A-114B.

Figure 5:
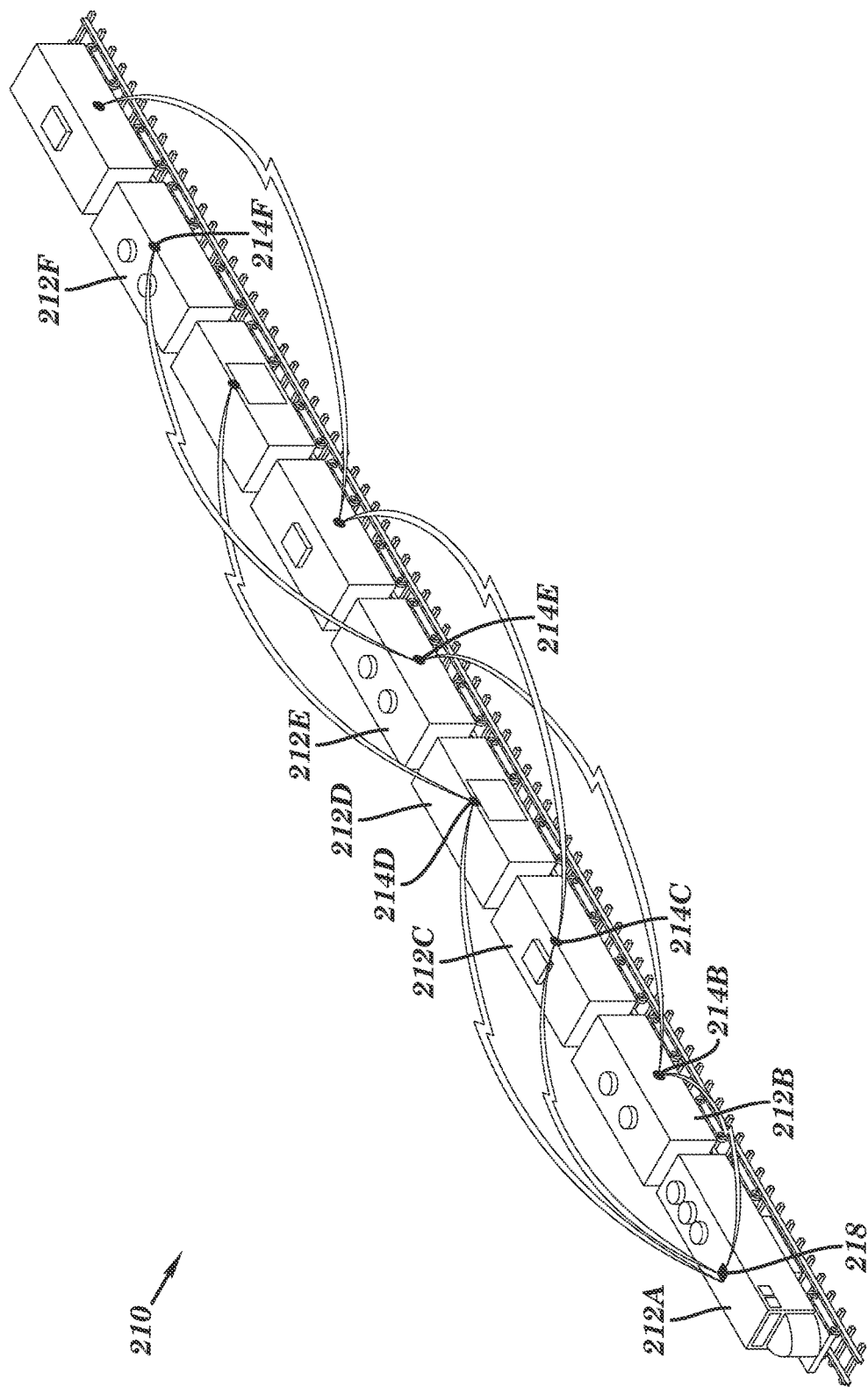
FIG. 5 shows an illustrative train including a locomotive with a group system located thereon according to an embodiment.

As described herein, the group system 118 can be moving with the group 110 (e.g., located on a locomotive or a vehicle included in the group 110) and/or stationary. FIG. 5 shows an illustrative train 210 including a locomotive 212A with a group system 218 located thereon according to an embodiment. While the train 210 is shown including a particular number and combination of types of rail vehicles, it is understood that the train 210 can include any number of any combination of types of rail vehicles. Additionally, while not shown, it is understood that the locomotive 212A can include a vehicle node as described herein. In an embodiment, the group system 218 also is configured to implement the functionality of a vehicle node as described herein.

Regardless, the train 210 includes multiple rail vehicles 212A-212F, at least one of which is a locomotive 212A. When a train includes multiple locomotives, the group system 218 present on one of the locomotives can be designated as the group system 218 for communicating with the various vehicle nodes 214B-214F on the train.

Regardless, each of the remaining rail vehicles 212A-212F is shown equipped with a corresponding vehicle node 214B-214F. However, it is understood that a group, such as a train 210, may include one or more vehicles that do not include a vehicle node 214B-214F. Additionally, it is understood that the placement of the vehicle nodes 214B-214F and the group system 218 on the corresponding vehicles 212A-212F are only illustrative of various possible locations for the vehicle nodes 214B-214F and the group system 218 on a vehicle 212A-212F. As illustrated, the vehicle nodes 214B-214F can communicate with the group system 218 via a direct communications link, as illustrated for the vehicle nodes 214B-214D, or an indirect communications link, as illustrated for the vehicle nodes 214E, 214F. In the latter case, one or more of the vehicle nodes 214B-214F can act as a relay in order to provide the communications link between the group system 218 and the vehicle nodes 214E, 214F. While a single relay is shown in FIG. 5, it is understood that communications between a vehicle node and the corresponding group system 218 can require any number of relays.

Figure 6:
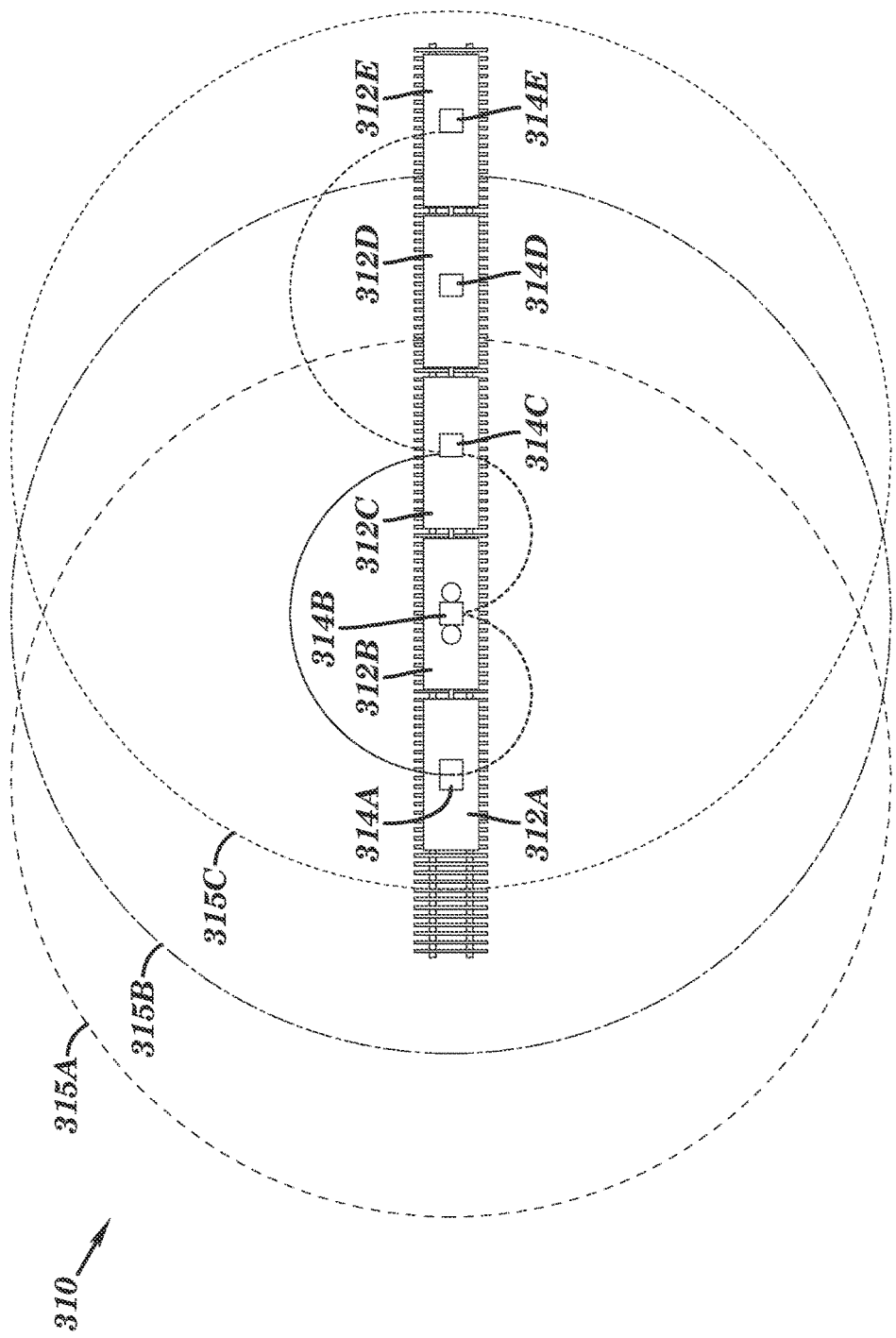
FIG. 6 shows a top view of an illustrative consist according to an embodiment.

FIG. 6 shows a top view of an illustrative consist 310 according to an embodiment. As illustrated, the consist 310 includes a series of connected rail vehicles 312A-312E. Each rail vehicle 312A-312E has a corresponding vehicle node 314A-314E. Illustrative communication ranges 315A-315C for the vehicle nodes 314A-314C, respectively, are shown. In this case, each communication range 315A-315C is shown having a radius of approximately 200-250 feet (e.g., 60-75 meters), which enables a vehicle node 314A-314C to communicate with another device (e.g., a vehicle node or a group system), which is located up to approximately 2.5 rail vehicle lengths. However, a vehicle node 314A-314E can be configured to have a significantly larger communication range, e.g., between 600 and 1,000 feet (e.g., between 180 and 305 meters) or more. In an embodiment, the communication range of a vehicle node 314A-314E under ideal conditions is approximately one kilometer (e.g., 3,281 feet). The larger communication range can be useful when the vehicle nodes 314A-314E are communicating with stationary group systems as well as a group system that may remain some distance away during operation of the vehicle, e.g., on a relatively long freight train.

Regardless, as illustrated, each vehicle node 314A-314E can communicate with an adjacent vehicle node 314A-314E, and data can be propagated up the consist 310 in this manner. However, in this case, the vehicle node 314E will be propagating transmissions for each of the previous vehicle nodes 314A-314D. The communication ranges 315A-315C can enable the data to be propagated using every other vehicle node 314A-314E. For example, the vehicle node 314A can communicate with the vehicle node 314C, which can communicate with the vehicle node 314E. In this manner, the propagation performed by any one vehicle node 314A-314E is cut in half from that performed when using the adjacent vehicle node 314A-314E to perform the propagation. For larger communication ranges, additional vehicle nodes can be skipped, which will result in a further reduction in the propagation performed by any one vehicle node 314A-314E. For example, as shown in FIG. 5, the communication range can be sufficient to enable communication between vehicle nodes located three rail vehicles apart (e.g., approximately 250-300 feet or 75-90 meters). For communication ranges between 600 and 1,000 feet (e.g., between 180 and 305 meters) or more, traffic on each vehicle node on a network can be significantly reduced. For example, for an average rail vehicle length of 75 feet (23 meters) and a radio range of 600 feet (180 meters), up to sixteen vehicle nodes would be within communication range (eight on either side). While the group system will be required to manage communications with many vehicle nodes, it can be designed for such a purpose and will generally have additional power available to implement the correspondingly higher processing required.

It is understood that while the selected relays correspond to the distances, this may not be the case in practice. For example, a vehicle node can dynamically select another vehicle node for use in relaying communications to/from a group system using a network cost calculation. In this case at each vehicle node, the network cost to reach the group system can be compiled for all possible destination vehicle nodes within communications range. Each vehicle node can select the destination vehicle node having the lowest cost (e.g., the least number of relays, least traffic, and/or the like) associated with it for use in relaying its communications. Such a process can be dynamic, however, there will generally be a relatively small number of reachable vehicle nodes from any individual vehicle node so the process should quickly converge on an efficient multi-car hopping approach.

Figure 7:
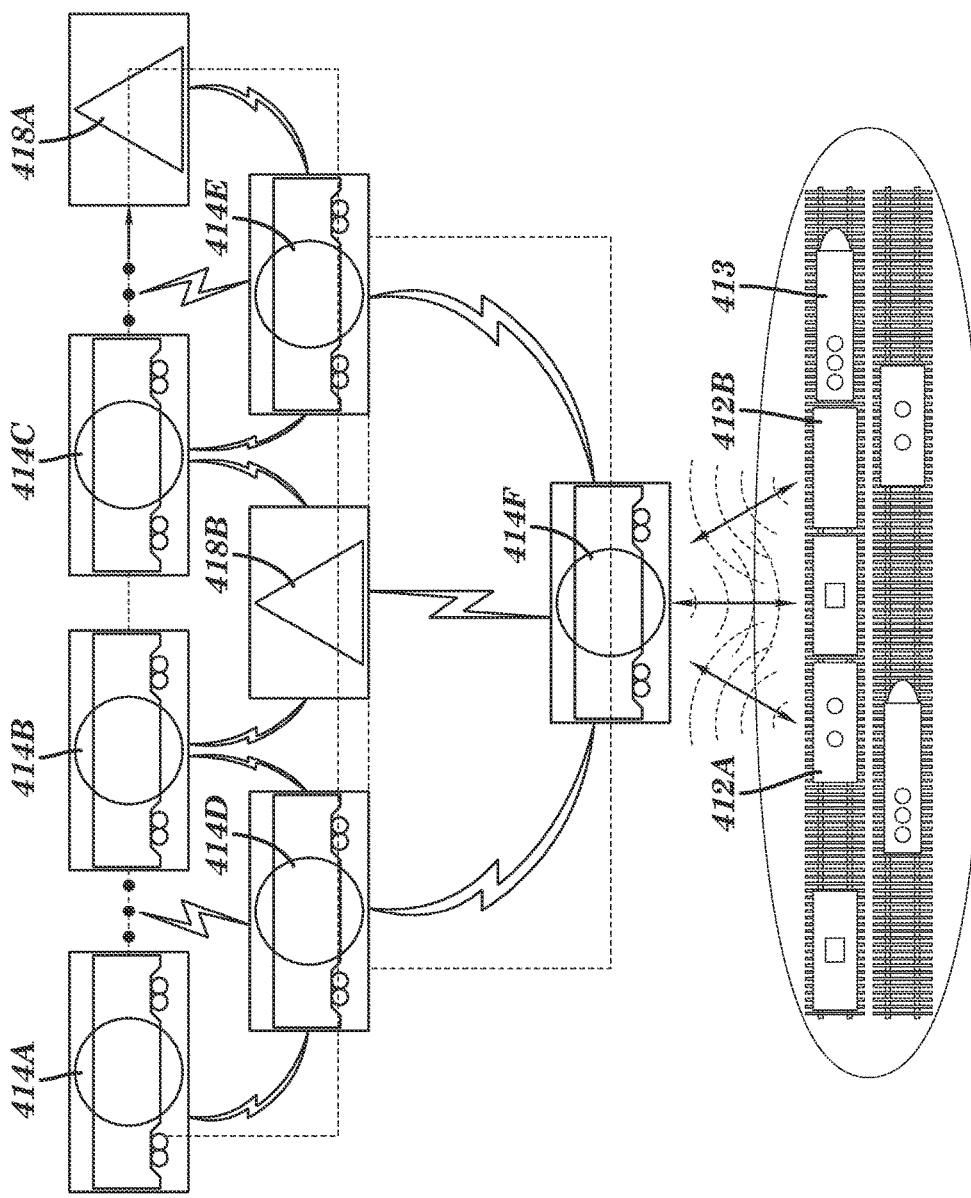
FIG. 7 shows an illustrative knowledge diagram according to an embodiment.

A vehicle node 314A-314E can acquire data from multiple sources of information, provide information for processing by one or more other components of an overall system, and/or the like. For example, FIG. 7 shows an illustrative knowledge diagram according to an embodiment. In this case, each vehicle node 414A-414F can include knowledge derived from various sources. For example, each vehicle node 414A-414F can comprise onboard knowledge, which can include: monitoring data acquired using the corresponding sensors located on the same vehicle; programmed information, such as information explicitly provided (e.g., identification), information derived over time (e.g., the configuration of sensors on the vehicle), vehicle identification information, geographic location information (e.g., of the vehicle, other vehicles, the group system, and/or the like), and/or the like. The onboard knowledge can be periodically updated and supplemented by communications with other information sources, including other vehicle nodes 414A-414F, group systems 418A, 418B, and/or the like.

Information can be obtained by a vehicle node 414A-414F using direct and/or indirect communication links. For example, using the vehicle node 414F as an illustrative vehicle node, the vehicle node 414F can have direct communication links with vehicle nodes 414D-414E and the group system 418B from which the vehicle node 414F can receive information. Additionally, the vehicle node 414F can receive information via indirect communication links with vehicle nodes 414A-414C and the group system 418A, for which a vehicle node 414D-414E and/or the group system 418B can act as a relay.

The vehicle nodes 414A-414F can be utilized to implement one or more new capabilities currently not available in a rail yard environment. For example, the vehicle nodes 414A-414F can provide a more sophisticated rail vehicle identification solution. In particular, the nodes 414A-414F can have a much greater communication range than a standard automatic equipment identification (AEI) tag commonly used in the rail industry or other types of radio frequency identification (RFID) tags, which also are commonly proposed in various applications. In a rail yard setting, RFID (e.g., AEI) readers often fail to recognize and/or distinguish between rail vehicles traveling on different tracks, both of which are within the range of the reader. By providing additional computing and/or communication capabilities to the vehicle nodes 414A-414F, the vehicle nodes 414A-414F can be more aware of the routing, associations with other rail vehicles, and/or the like. As a result, the vehicle node 414A-414F can provide unambiguous information, including a current relationship with other vehicles, and not just an identification number. Furthermore, the vehicle nodes 414A-414F can provide additional information, such as data corresponding to the cargo being shipped on the associated vehicle, a condition of the cargo and/or the rail vehicle (e.g., based on data received from the sensors on the rail vehicle), and/or the like.

In an embodiment, a vehicle node, such as the vehicle node 414F, can generate general range and direction analysis data, which can be stored as monitoring data 54 (FIG. 3). For example, the vehicle node 414F can generate estimates of distances to various rail vehicles 412A, 412B, a locomotive 413, and/or the like. When such data is combined with similar data generated by multiple vehicle nodes 414A-414F (e.g., on a vehicle node 414A-414F and/or on a group system 418A, 418B), a general physical topology of a local area with respect to the relative vehicle locations can be generated. This data can be used, for example, to dynamically determine and recognize an order of the rail vehicles in a consist, such as a fully assembled train. The vehicle node 414A-414F can use such knowledge to, for example, dynamically identify one or more potential intermediate vehicle nodes for communicating with a group system (which may change over time due to relative movement of the vehicle node(s) with respect to the group system), anticipate/determine that a group system will be/is no longer accessible, anticipate/determine that a group system will be/is no longer an appropriate group system, dynamically identify a group system from multiple possible group systems, and/or the like.

In an embodiment, a vehicle node 414A-414F is configured to operate in a environment including multiple group systems 418A-418B within a communications range of the vehicle node 414A-414F. For example, a railyard can be expected to include one or more vehicle nodes 414A-414F and one or more locomotives present in the railyard also may include a vehicle node. In order to maintain the coherence and integrity of the data collected for the corresponding rail vehicle, the vehicle node 414 can implement a systematic solution for determining the group system 418A, 418B with which it should communicate at any point in time. Furthermore, when operating in a location with multiple group systems, the group systems 418A-418B can be organized into a hierarchy, in which one group system can provide instructions to another group system.

Figure 8:
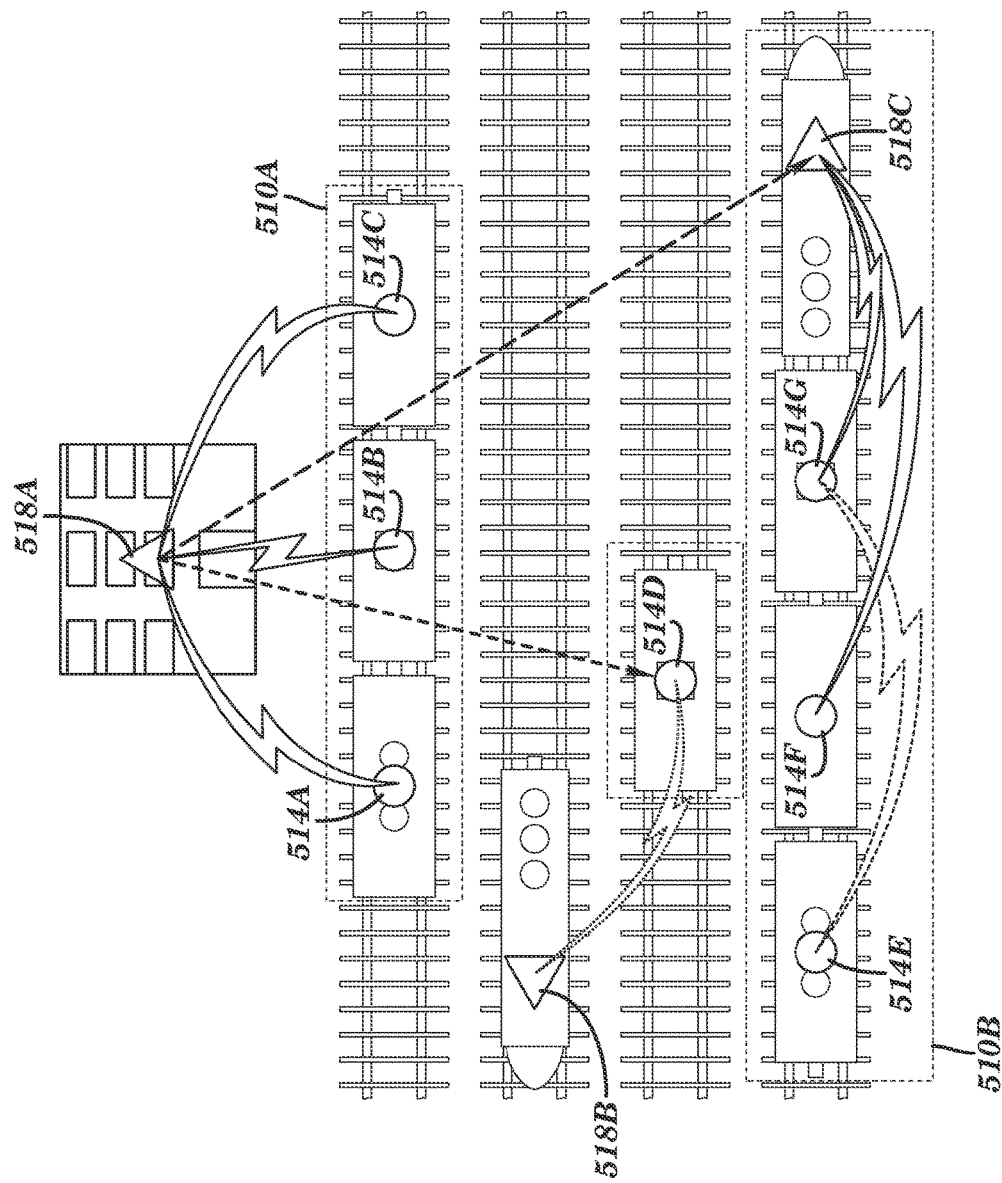
FIG. 8 shows an illustrative railyard according to an embodiment.

For example, FIG. 8 shows an illustrative railyard according to an embodiment. The railyard is shown including a group system 518A located in a fixed position. Additionally, two locomotives are shown, each with a corresponding group system 518B-518C. In this case, the group systems 518A-518C can be assumed to be within communications range of each other as well as each of the vehicle nodes 514A-514G shown in conjunction with corresponding rail vehicles. The group system 518A for the railyard can be designated as a managing group system for the railyard. As a result, the group system 518A can transmit directives to the other group systems 518B, 518C, which are passing through the railyard. In an embodiment, each vehicle node 514A-514G continues to communicate with a corresponding group system 518A-518C until receiving an instruction from the group system that is should communicate with another group system.

In another embodiment, a vehicle node 514A-514G not in communications with any group system 518A-518C can dynamically determine which group system 518A-518C with which to communicate. In this case, a vehicle node 514A-514G can determine whether the rail vehicle is associated with a locomotive. If not, the vehicle node 514A-514G can communicate with the group system 518A for the railyard (e.g., since it is the managing group system for the railyard). To this extent, the vehicle nodes 514A-514C are shown located on rail vehicles that are part of a consist 510A, without a locomotive, and the vehicle node 514D is shown located on a rail vehicle that is not attached to any other rail vehicles. As a result, the vehicle nodes 514A-514D can communicate with the group system 518A for the railyard.

If the vehicle node 514A-514G is currently communicating with a group system, e.g., since the rail vehicle is associated with locomotive including the group system, the vehicle node 514A-514G can continue to communicate with the group system until it is assigned to another group system or can no longer communicate with the group system. A determination as to whether the rail vehicle is associated with a locomotive can be implemented using any solution. For example, for vehicle nodes 514E-514G, the rail vehicles may be part of a train 510B, which entered the railyard. As a result, the vehicle nodes 514E-514G can continue to communicate with the group system 518C until being disassembled from the train 510B. A vehicle node 514E-514G can determine that the corresponding rail vehicle has been disassembled from a locomotive using any solution. In an embodiment, the vehicle nodes 514E-514G receive such an indication from the group system 518C, which in turn can receive the indication from the group system 518A. In another embodiment, the vehicle nodes 514E-514G can dynamically determine that a decoupling has occurred. For example, a vehicle node 514E-514G can use range and direction analysis data described herein to determine that the corresponding rail vehicle is no longer moving in sync with a rail vehicle located between the rail vehicle and the locomotive and/or with the locomotive itself. Similarly, the vehicle node 514E-514G can evaluate operating data received from the corresponding sensor nodes as being indicative of the rail vehicle being disassembled from one or more rail vehicles (e.g., detecting a change in momentum indicative of being detached from another rail vehicle). Regardless, the vehicle node 514E-514G can communicate with one or more other vehicle nodes on the train 510B to assist each vehicle node 514E-514G in evaluating whether a disassembly occurred. Furthermore, another system, such as a rail vehicle disassembly system, can transmit a signal indicating that a disassembly has occurred, which in turn can be processed by the group system 518C and/or vehicle nodes 514E-514G.

Once a vehicle node determines it is no longer part of the train 510B, the vehicle node 514E-514G can commence communications with the group system 518A for the railyard. Similarly, a vehicle node can determine that it is associated with a group system located on a locomotive using any solution. For example, the group system 518A can transmit a directive to the vehicle node 514D indicating that the vehicle node 514D should commence communicating with the group system 518B as the corresponding rail vehicle is going to be included on a train including the locomotive. Alternatively, a vehicle node can dynamically determine that the corresponding rail vehicle has been assembled to a locomotive using range and direction analysis data, operating data, communications with vehicle nodes located on other rail vehicles in the train, a communication from a group system and/or an assembly system, and/or the like. Furthermore, it is understood that a managing group system 518A can issue any of various types of directives to the group systems 518B-518C and/or vehicle nodes 514A-514G. Additionally, a monitoring system 20 (FIG. 1) also can issue various types of directives to the group systems 518A-518C. Illustrative directives include, but are not limited to, reassigning rail vehicles in a train to a different group system; updating software; assigning vehicle nodes for additional rail vehicles to communicate with the group system 518B-518C; downloading accumulated data from the group system 518B-518C; and/or the like.

Figure 9:
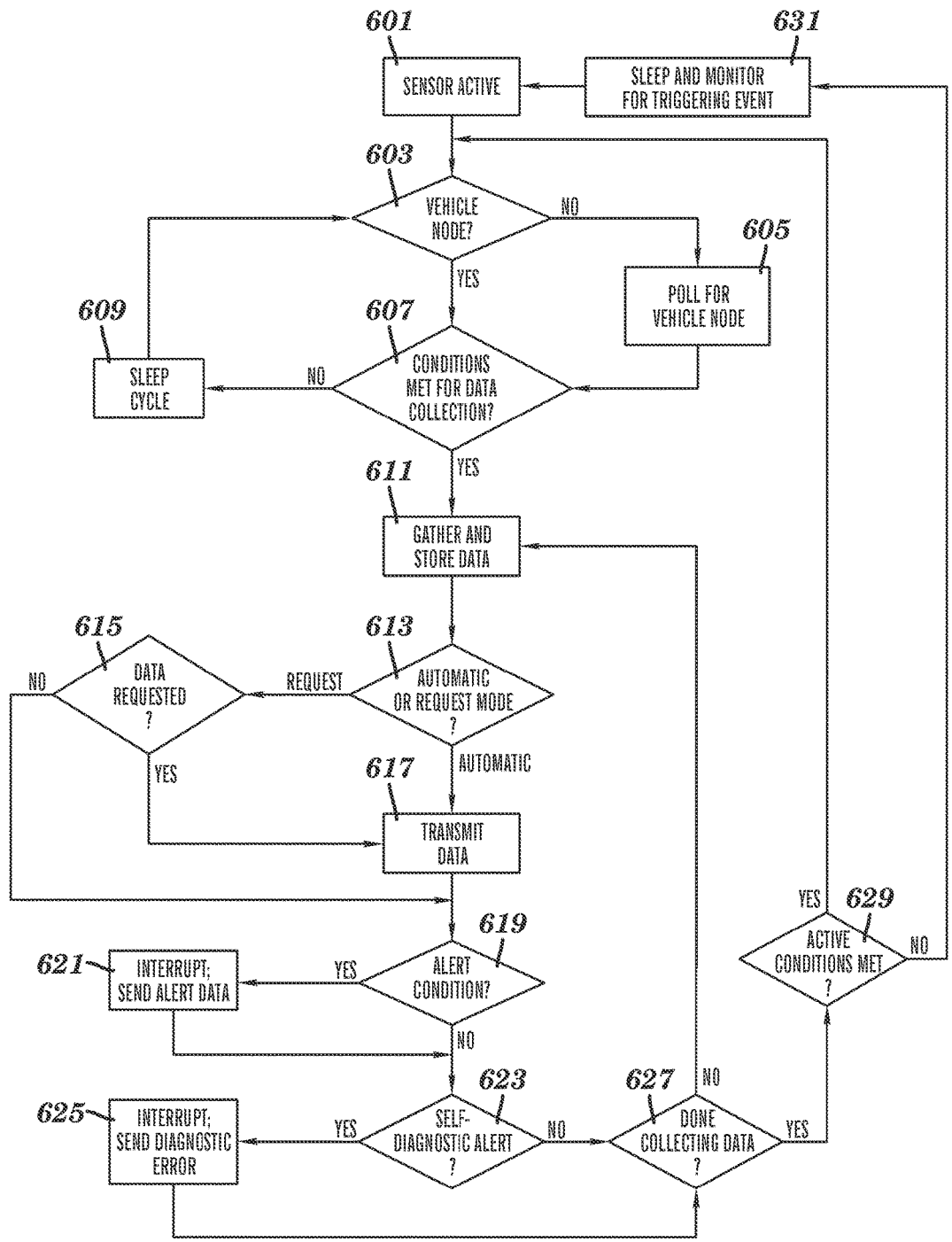
FIG. 9 shows an illustrative flowchart of operation of a sensor node according to an embodiment.

Returning to FIG. 2, various aspects of operation of an illustrative sensor node 16 are described in conjunction with FIG. 9, which shows an illustrative flowchart of operation of a sensor node 16 according to an embodiment. In action 601, the sensor node 16 can become active (e.g., after entering a sleep mode) using any solution. For example, the sensor node 16 can be initially operating in an extremely low power stand-by mode of operation during which many of the components are not powered (sleep mode). The sensor node 14 can use a cyclic check process to determine whether a wakeup condition is met, such as an occurrence of a triggering event (e.g., a signal received from the vehicle node 14, the vehicle 12 commencing movement, a particular temperature being sensed, and/or the like). In response to the wakeup condition being met, the sensor node 16 can begin operating in an active mode in which all of the components are powered for operation as described herein.

In action 603, the sensor node 16 can determine whether the node 16 can communicate with the vehicle node 14 for the vehicle 12. For example, the sensor node 16 can verify that a direct communications link (e.g., wireless, wired, and/or the like) and/or a previously utilized indirect communications link (e.g., via another node, the identification of which is stored on the sensor node 16) exists between the sensor node 16 and the vehicle node 14. For example, the sensor node 16 can transmit an acknowledgement message and wait for a response from the vehicle node 14 to be received. When the sensor node 16 fails to identify either a direct or a previously utilized indirect communications link with the vehicle node 14, the sensor node 16 can seek to establish a new indirect communications link using any solution (e.g., sending a query message for processing by other sensor nodes, which can respond when a communications link is available from that sensor node to the vehicle node 14). In action 605, the sensor node 16 can periodically reattempt to establish a communications link with the vehicle node 14 until the communications link is successfully established.

Regardless of whether sensor node 16 can communicate with the vehicle node 14, in action 607, the sensor node 16 can determine whether the conditions for data collection by the sensor node 16 are met. A particular set of conditions can vary widely based on the configuration of the sensor node 16, which can be configured to implement fairly complex timing processing, if desired. Illustrative conditions can be timing related, conditional on one or more attributes of the operating environment (e.g., level of vibration, temperature, and/or the like). When the sensor node 16 determines that the conditions for data collection are not met, in action 609, the sensor node 16 can enter a sleep cycle for a period (e.g., until a trigger event occurs or an amount of time passes), after which the sensor node 16 can evaluate the conditions again and attempt to establish communications with the vehicle node 14, if necessary.

Otherwise, in action 611, the sensor node 16 commences gathering and storing data. In an embodiment, the sensor node 16 can be configured to implement one of a plurality of transmission modes. To this extent, in action 613, the sensor node 16 can determine whether the sensor node 16 should automatically transmit the data for processing by the vehicle node 14 or only do so in response to a request by the vehicle node 14. When the sensor node 16 is operating in the request mode, in action 615, the sensor node 16 can determine whether the vehicle node 14 has requested the data. When the vehicle node 14 has made such a request or the sensor node 16 is operating in an automatic transmission mode (and communication with the vehicle node 14 has been established), in action 617, the sensor node 16 can transmit the operating data for processing by the vehicle node.

Regardless of whether the sensor node 16 transmits any data, in action 619, the sensor node can examine the operating data to determine whether an immediate alert condition exists. Such a determination can vary widely based on the particular configuration for the sensor node 16. An illustrative alert condition for a sensor node 16 configured to monitor temperature on a refrigerator car can be when the detected temperature is above a particular threshold level. Another illustrative alert condition for a sensor node 16 located on a wheel truck can comprise detection of a particular level or pattern of vibrations. However, it is understood that these alerts are only illustrative. Additionally, it is understood that the processing of operating data for the presence of one or more alerts can be implemented by the vehicle node 14 instead of by the sensor node 16. In any event, when an alert condition exists, in action 621, the sensor node 16 can transmit an interrupt message for processing by the vehicle node 14. The interrupt message can cause the vehicle node 14 and/or other sensor nodes 16 to prioritize communications from the sensor node 16. Additionally, the sensor node 16 can upload operating data corresponding to the alert condition (e.g., an identification of the condition, raw data evaluated for the condition, and/or the like).

In action 623, the sensor node 16 can perform a set of self-diagnostic tests to determine whether any problems (e.g., a failure of a sensor) exist with respect to the functionality of the sensor node 16 itself. When a problem is detected, in action 625, the sensor node 16 can transmit an interrupt message as well as the self-diagnostic data for processing by the vehicle node 14. In either case, in action 627, the sensor node 16 can determine whether the current data collection operation is complete. If not, the process can return to action 611 and the sensor node 16 can continue to collect data. When the data collection operation is complete, in action 629, the sensor node 16 can determine whether it is to remain active. If so, the process can return to confirming a communications link with the vehicle node 16. Otherwise, in action 631, the sensor node 16 can re-enter a sleep mode of operation.

Figure 10:
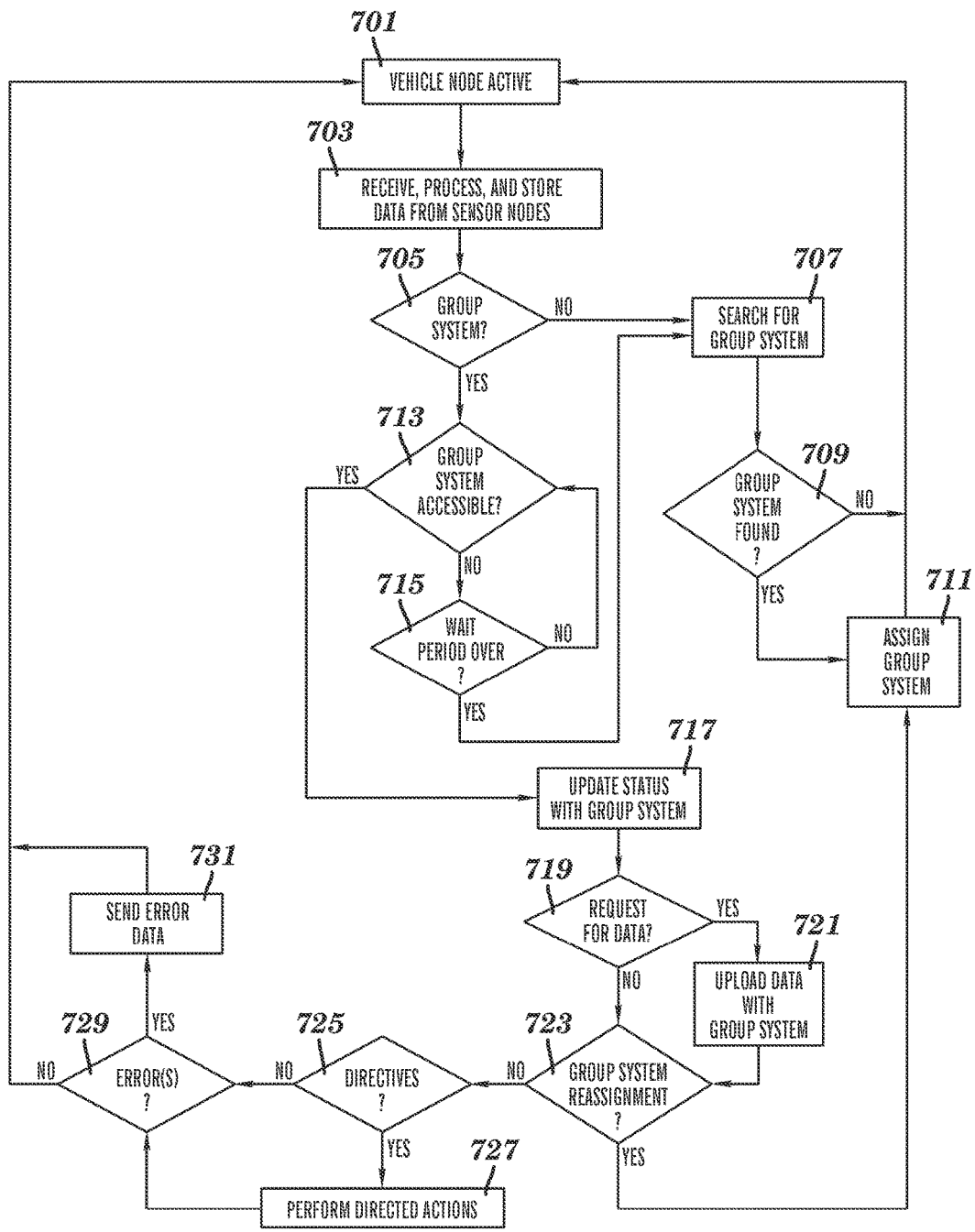
FIG. 10 shows an illustrative flowchart of operation of a vehicle node according to an embodiment.

Various aspects of operation of an illustrative vehicle node 14 are now described in conjunction with FIG. 2 and FIG. 10, which shows an illustrative flowchart of operation of a vehicle node 14 according to an embodiment. In action 701, the vehicle node 14 commences an active operating mode (e.g., in response to a command from another system (such as on the vehicle 12 or at a railyard), in response to a detected event (such as an engine start), and/or the like). In action 703, the vehicle node 14 receives, processes, stores, and/or the like, operating data from the various sensor nodes 16 located on the vehicle 12. As part of this action, the vehicle node 14 can manage communications between the vehicle node 14 and the various sensor nodes 16, e.g., when automatically receiving data from the sensor nodes 16, requesting data from the sensor nodes 16, and/or the like. Additionally, the vehicle node 14 can generate monitoring data for the vehicle 12 based on the operating data as described herein.

In action 705, the vehicle node 14 can determine whether it is assigned to a group system 18. For example, the vehicle node 14 can have identification information for communicating with the group system 18, which can be stored from being previously utilized, provided as an initial setting, and/or the like. Alternatively, the vehicle node 14 may not have a corresponding group system 18 assigned, e.g., when initially activated. In this case, in action 707, the vehicle node 14 searches for a group system 18 within communications range (e.g., by transmitting a query and waiting to receive a response from a group system 18). In action 709, the vehicle node 14 can determine whether a group system 18 has been found (e.g., after transmitting a predetermined number of queries, receiving a response from a group system 18, and/or the like). When a group system 18 has been found, in action 711, the vehicle node 14 can assign itself to commence communications with the group system 18. In either case, the process can return to action 701.

When the vehicle node 14 determines that a group system 18 is assigned in action 705, in action 713, the vehicle node 14 can determine whether the vehicle node 14 can still communicate with the group system 18 either directly or indirectly (e.g., by transmitting a message and waiting for a response from the group system 18, transmitting a message for processing by other vehicle nodes 14, and/or the like). When the vehicle node 14 is unable to reestablish communications with the group system 18, the vehicle node 14 can reattempt to establish communications until the group system 18 determines, in action 715, that a period for reestablishing communication with an assigned group system 18 has expired or the communications are successfully reestablished in action 713. When the time period has expired, the process can continue to action 707, in which the vehicle node 14 searches for another group system 18.

Actions 705-715 enable a relationship between a vehicle node 14 and a group system 18 to persist, even when multiple group systems 18 are present within a communications range of the vehicle node 14. For example, in a railyard, several group systems 18 may be present (e.g., installed at the railyard, on a locomotive, and/or the like) and concurrently operating. However, it may be desirable for each vehicle node 14 to maintain its association with a particular group system 18 even when another group system 18 is closer to the vehicle node 14. For example, vehicle node 14 may be located on a rail vehicle attached to a train, which is passing through a railyard. In an embodiment, the vehicle node 14 can maintain its association with a particular group system 18 until the vehicle node 14 is directed to change group systems 18 (e.g., by the group system 18 or another group system) or the vehicle node 14 is unable to communicate with the associated group system 18 for a predetermined period of time. As a result, a vehicle node 14 will maintain its association with a group system 18 for a train, even though the group system 18 may be several transmission hops away, rather than switching to a group system 18, which may be located closer. This allows and encourages consists and trains to be treated as conceptual units within the communications system.

Once the vehicle node 14 confirms communications with a group system 18, in action 717, the vehicle node 14 can update its status with the group system 18 using any solution, e.g., informing the vehicle node 14 that it is active and obtaining operating data, and/or the like. In action 719, the vehicle node 14 can determine whether it should provide monitoring data for the vehicle 12 for processing by the group system 18. For example, the vehicle node 14 can determine whether a request for data has been received from the group system 18, whether a time period has expired since a previous automatic upload, whether the vehicle node 14 has authority to upload data on demand, and/or the like. In response to a determination that the monitoring data should be provided, in action 721, the vehicle node 14 can transmit the monitoring data for processing by the group system 18.

In action 723, the vehicle node 14 can determine whether the vehicle node 14 has been assigned to a new group system 18 (e.g., has received a reassignment directive from the current group system 18). If so, the process continues to action 711 in which the vehicle node 14 assigns itself to commence communications with the new group system 18. When the vehicle node 14 has not been reassigned, in action 725, the vehicle node 14 can determine whether any directives by the group system 18 have been received that require processing. If so, in action 727, the vehicle node 14 can process the directive(s). In action 729, the vehicle node 14 can determine whether any error/failure conditions are present (e.g., trouble with the vehicle node 14, failure of a sensor node 16, detection of a problem condition on the vehicle 12 by the vehicle node 14 and/or a sensor node 16, and/or the like). If so, in action 731, the vehicle node 14 can transmit data corresponding to the error/failure condition(s) for processing by the group system 18. In either case, the process can return to action 701. While evaluation of various conditions (e.g., reassignment, directives, errors, etc.) are shown as being performed in series, these actions can be performed in parallel and/or a different order. For example, the vehicle node 14 can receive data corresponding to an alert condition from a sensor node 16 as an interrupt, and in response, the vehicle node 14 can process the alert condition in parallel and/or prioritized over a current action in the process.

Figure 11:
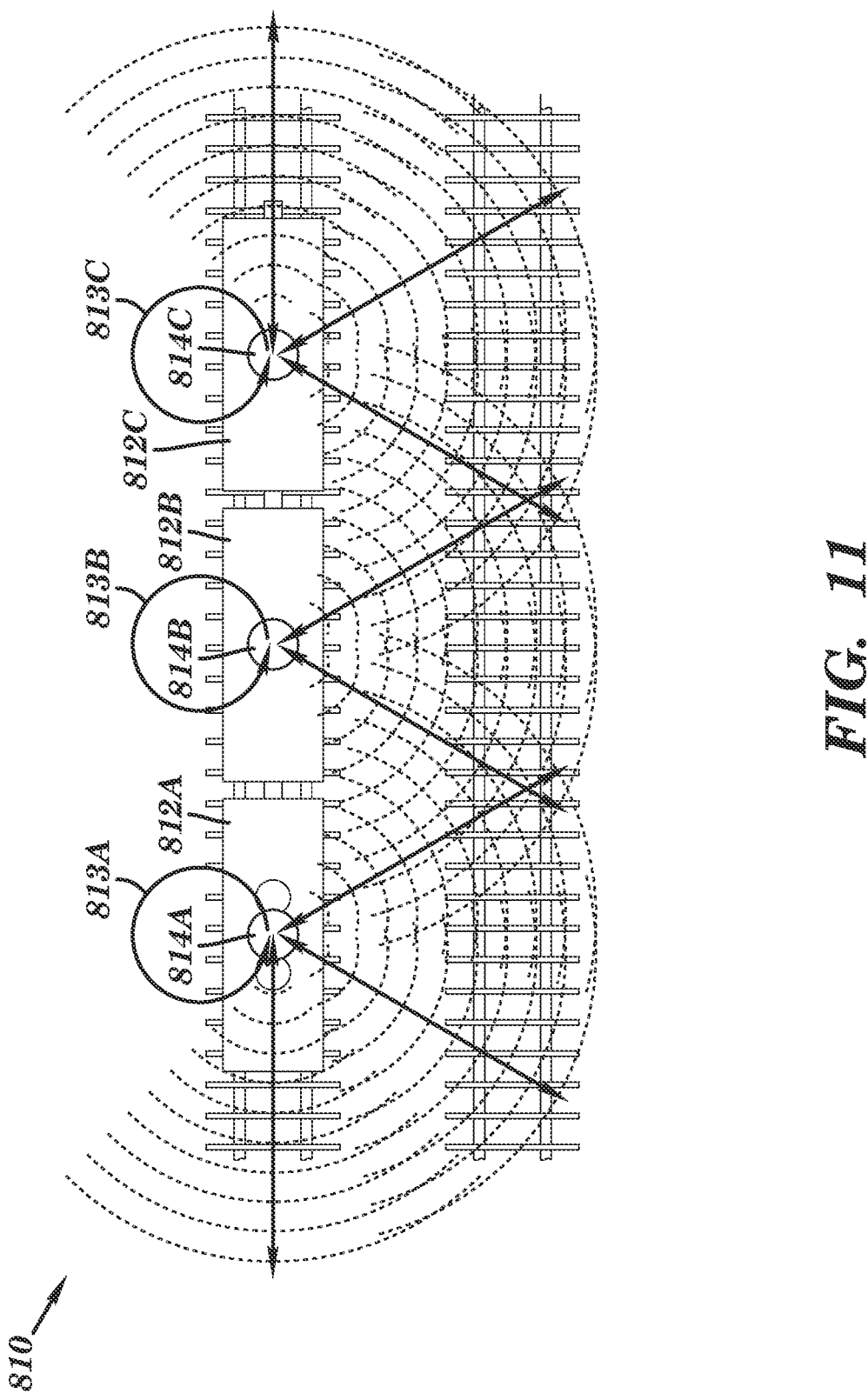
FIG. 11 shows an illustrative group of rail vehicles including vehicle nodes according to an embodiment.

During operation, a vehicle node 14 and/or a group of vehicle nodes may not be associated with a group system 18 for an extended period of time. For example, the vehicle node 14 may be activated for the first time, one or more rail vehicles 12 may be left on a siding that is out of communications range for any group systems 18 for a period of time, and/or the like. FIG. 11 shows an illustrative group 810 of rail vehicles 812A-812C including vehicle nodes 814A-814C according to an embodiment. When no group system 18 (FIG. 1) is available, as indicated by arrows 813A-813C, each vehicle node 814A-814C can continue to operate and acquire data from the various sensors located on each rail vehicle 812A-812C. Additionally, each vehicle node 814A-814C can periodically poll the nearby region (as indicated by the arrows and dashed arcs). In this state, the vehicle nodes 814A-814C can continue to operate as a group 810. To this extent, the vehicle nodes 814A-814C can communicate with one another, sharing status information. Once a single vehicle node 814A-814C successfully communicates with a group system 18, it can act as an intermediary to enable the other vehicle nodes 814A-814C in the group 810 to communicate with the group system 18.

As described herein, a group system 18 within communications range of the vehicle nodes 814A-814C may be instructed not to respond to queries sent by the vehicle nodes 814A-814C as they are not part of the group of vehicle nodes assigned to the group system 18. However, a group system 18 can temporarily communicate with one or more of the vehicle nodes 814A-814C in certain situations. For example, during operation, one or more of the vehicle nodes 814A-814C may detect an alert condition. However, without a group system 18 in communication with the vehicle nodes 814A-814C, no action can be taken to address the alert condition. In this case, the vehicle nodes 814A-814C can alter the polling for available group systems 18 to indicate that one or more alert conditions are present. In response to receiving such a poll, a group system 18 can receive and process information on the alert condition, which the group system 18 can forward to another group system, a monitoring system 20 (FIG. 1), and/or the like, for action.

Returning to FIG. 1, as described herein, a group system 18 can manage communications between various monitoring systems 20 and the vehicle nodes 14A-14C, where each monitoring system 20 may belong to an entity entitled to obtain information on and/or manage only a subset of the vehicle nodes 14A-14C. Similarly, a vehicle node 14A-14C can manage communications between various sensors 16A-16C and the monitoring systems 20, where each monitoring system 20 may belong to an entity entitled to obtain information on and/or manage only a subset of the sensors 16A-16C. In this case, the group system 18 and/or vehicle node 14A-14C can implement a communications security protocol, which only allows each monitoring system 20 to obtain information and/or provide directives for those vehicles 12A-12C and/or sensors 16A-16C to which the monitoring system 20 is entitled. Similarly, the group system 18 and/or vehicle node 14A-14C can restrict communications between the group 10 and other systems not entitled to any information regarding the group 10.

For example, for a given group 10, such as a train, the monitoring systems 20 can belong to various entities including: a railroad company, which is managing the overall train; one or more shipping companies, each of which may be managing a subset of the rail vehicles on the train; one or more manufacturers, each of which may be managing cargo present on a subset of the rail vehicles; and/or the like. In this case, the group system 18 and/or vehicle nodes 14A-14C can restrict requests for information, limit directives, and/or the like, to only those monitoring system(s) 20 for the appropriate entities. For example, a shipping company may be able to obtain sensor data corresponding to its rail vehicles, but not other rail vehicles on the train, a manufacturer may be able to find location information and/or status information for its cargo but not any other attributes of the rail vehicle(s) and/or train, etc. Such security can be implemented using any secure communications solution, e.g., a public key infrastructure (PKI), and/or the like.

While various aspects of the invention have been shown and described in conjunction with rail vehicles included in a consist, such as a train, it is understood that embodiments can be implemented in various types of rail and non-rail applications. For example, an embodiment can be implemented in a group of military vehicles (air, land, or sea vehicles). In this case, inclusion of the sensors, vehicle nodes, and group systems described herein on the vehicles can allow the operations of the vehicles in the group to be properly and automatically tracked by various entities, allow the detection of potential or actual failures of one or more components of a vehicle in the group, monitor the condition of cargo being carried by one or more of the vehicles, better coordinate operations of the group, and/or the like.

An embodiment can be implemented in a public transportation environment, such as a transit rail, taxis, busing, and/or the like. In an application, such as a busing/taxi application, groups can be dynamically formed and modified based on the vehicles temporarily traveling the same route. Such an ad hoc group formation can enable various information to be shared among the vehicles. A vehicle node on a vehicle can subsequently share information when a group system is within a communications range (e.g., adjacent to a commonly traveled roadway, at a garage, and/or the like). The operating information also can include data corresponding to a percentage of occupied seating and other operational statistics, which can be utilized for better route planning, and/or the like.

Additionally, a vehicle can comprise only a storage container itself, which can be located on a truck, rail vehicle, ship, and/or the like. In this case, a group can be defined based on containers in a shipment. Furthermore, multiple distinct groups can be defined based on consignment to a particular entity (e.g., a corporation), a larger grouping of containers in a shipment traveling to a common destination (e.g., a port), and a still larger grouping of containers including the entire cargo manifest (e.g., for a given ship). In this case, an embodiment can monitor the condition of the cargo and/or containers, verify the shipping of all associated containers to appropriate interim and final destinations, and/or the like.

While shown and described herein as a method and system for managing communications with and data corresponding to a group of associated vehicles, it is understood that aspects of the invention further provide various alternative embodiments. For example, in one embodiment, the invention provides a computer program fixed in at least one computer-readable medium, which when executed, enables a computer system, such as the group system 18 shown in FIG. 3, to manage communications with and/or data corresponding to a group of associated vehicles. To this extent, the computer-readable medium includes program code, such as the management program 50 (FIG. 1), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the management program 50 (FIG. 1), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for managing communications with and data corresponding to a group of associated vehicles. In this case, the generating can include configuring a computer system, such as the group system 18 (FIG. 3), to implement a method of managing communications with and data corresponding to a group of associated vehicles described herein. Additionally, the generating can include configuring sensor(s), vehicle nodes, and/or the like, on each vehicle. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. To this extent, a process described herein can be modified to include fewer or additional acts, acts performed in a different order and/or concurrently, and/or the like. Similarly, a configuration of hardware described herein can be modified to include additional components, alternative components and/or configurations of components, and/or the like. The foregoing description is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method comprising:
    determining, on a first vehicle node located on a first vehicle, a first group system assigned to manage data corresponding to a group of associated vehicles including a plurality of vehicles, wherein the first group system is located apart from the first vehicle;
    receiving, at the first vehicle node, first vehicle operating data from a plurality of sensors located on the first vehicle;
    processing, on the first vehicle node, the operating data to generate monitoring data corresponding to the first vehicle;
    managing, on the first vehicle node, network communication data regarding a plurality of vehicle nodes in the group of associated vehicles, wherein the managing includes maintaining and updating the network communication data based on current routing data for the first vehicle node to communicate with a first set of vehicle nodes and data identifying current routing for communications connectivity between other vehicle nodes in the group of associated vehicles received from at least one other vehicle node in the group of associated vehicles;
    determining, on the first vehicle node, a most efficient communications route for communicating with the first group system according to the network communication data; and
    transmitting, from the first vehicle node, the monitoring data for processing on the first group system using the most efficient communications route.

2. The method of claim 1, wherein the receiving includes:
    transmitting a request for the operating data for processing by a sensor node, wherein the sensor node is a sensor in the plurality of sensors; and
    receiving a response to the request from the sensor node, wherein the transmitting and receiving use a wireless communications protocol.

3. The method of claim 1, wherein the first group system is located on a second vehicle distinct from the first vehicle.

4. The method of claim 3, wherein the second vehicle is physically connected to the first vehicle, and wherein the first vehicle does not include an onboard control or navigation system.

5. The method of claim 1, wherein the first vehicle node is located on a roof of the first vehicle, and wherein the first vehicle node has a communications range of less than one kilometer.

6. The method of claim 1, wherein the network communication data further includes at least one of: range and direction analysis data or a network cost calculation for each of the plurality of vehicle nodes.

7. The method of claim 1, further comprising receiving, at the first vehicle node, a request for the monitoring data generated by the first group system, wherein the transmitting is in response to the receiving.

8. The method of claim 1, wherein the processing includes deriving monitoring data by filtering and analyzing at least some of the operating data received from the plurality of sensors, the method further comprising identifying, by the first vehicle node, at least one error condition based on the processing, wherein the transmitting is in response to the identifying.

9. The method of claim 1, further comprising, on the first vehicle node:
    determining that the first group system is no longer accessible;
    periodically attempting to reestablish communications with the first group system for a reestablishment time period; and
    searching for a new group system in response to failing reestablish communications with the first group system during the reestablishment time period.

10. The method of claim 1, further comprising, on the first vehicle node:
    receiving a directive reassigning the first vehicle node to a second group system;
    establishing communications with the second group system in response to the directive; and
    halting communications with the first group system in response to the establishing.

11. The method of claim 1, wherein the network communication data further includes topology data corresponding to relative locations of the plurality of vehicles and a set of group systems including the first group system, wherein at least one of: the determining or the transmitting, uses the topology data.

12. The method of claim 1, further comprising the first vehicle node periodically broadcasting data corresponding to the current routing data for the first vehicle node.

13. A system comprising:
    a first vehicle including:
        a first vehicle node; and
        a plurality of sensors, wherein the first vehicle node is configured to perform a method including:

determining a first group system corresponding to the first vehicle, wherein the first group system is located apart from the first vehicle;

receiving operating data from the plurality of sensors;

processing the operating data to generate monitoring data corresponding to the first vehicle;

managing network communication data regarding a plurality of vehicle nodes in communication with the first group system, wherein the managing includes maintaining and updating the network communication data based on current routing data for the first vehicle node to communicate with a first set of vehicle nodes and data identifying current routing for communications connectivity between other vehicle nodes in the plurality of vehicle nodes received from at least one other vehicle node in the plurality of vehicle nodes;

determining a most efficient communications route for communicating with the first group system according to the network communication data; and transmitting the monitoring data for processing on the first group system using the most efficient communications route, wherein the first vehicle node has a communications range of less than one kilometer.

14. The system of claim 13, wherein the first vehicle belongs to a group of associated vehicles including a plurality of vehicles, and wherein the first group system is assigned to manage data corresponding to the plurality of vehicles while the group of associated vehicles is traveling.

15. The system of claim 14, further comprising:
a second vehicle including a second vehicle node, wherein the second vehicle is traveling in the group of associated vehicles; and
the first group system, wherein the first group system is configured to manage communications between each vehicle node in the group of associated vehicles and a set of monitoring systems.

16. The system of claim 15, wherein the first group system is located on one of the first vehicle or the second vehicle.

17. The system of claim 15, wherein the first and second vehicles are physically connected, and wherein at least one of the first or second vehicle does not include an onboard control or navigation system.

18. The system of claim 13, wherein the plurality of sensors includes at least one sensor node configured to communicate with the first vehicle node using a wireless communications solution.

19. The system of claim 18, wherein the at least one sensor node includes a power generating source capable of generating sufficient power required to operate the at least one sensor node while the first vehicle is in motion, and wherein the first vehicle node includes a renewable power generating component.

20. A system comprising:
a first group system including at least one computing device; and
a consist including a plurality of managed rail vehicles, wherein each of the plurality of managed rail vehicles includes:
a first vehicle node; and
a plurality of sensors, wherein the first vehicle node is configured to perform a method including:
receiving operating data from the plurality of sensors;
processing the operating data to generate monitoring data for the corresponding rail vehicle;
managing network communication data regarding a plurality of vehicle nodes in the plurality of managed rail vehicles, wherein the managing includes maintaining and updating the network communication data based on current routing data for the first vehicle node to communicate with a first set of vehicle nodes and data identifying current routing for communications connectivity between other vehicle nodes in the plurality of vehicle nodes received from at least one other vehicle node in the plurality of vehicle nodes;
determining a most efficient communications route for communicating with the first group system according to the network communication data; and
transmitting the monitoring data for processing on the first group system using the most efficient communications route, wherein the first group system is assigned to manage data corresponding to the plurality of managed rail vehicles and communications between the plurality of vehicle nodes in the consist and a set of monitoring systems.

21. The system of claim 20, further comprising a locomotive connected to the plurality of connected rail vehicles, wherein the first group system is located on the locomotive.

22. The system of claim 20, wherein each vehicle node has a communications range of less than one kilometer, and wherein at least one vehicle node dynamically identifies at least one other vehicle node to act as a relay for communications between the at least one vehicle node and the first group system using the network communication data.

23. The system of claim 20, wherein the first group system is located at a railyard, and wherein the first group system is configured to assign the plurality of connected rail vehicles to a second group system located on a locomotive to which the consist will be attached.

* * * * *